US012598207B2

(12) United States Patent
Warake et al.

(10) Patent No.: US 12,598,207 B2
(45) Date of Patent: Apr. 7, 2026

(54) BUILDING MANAGEMENT SYSTEM CYBERSECURITY INDEX

(71) Applicant: Tyco Fire & Security GmbH, Neuhausen am Rheinfall (CH)

(72) Inventors: Ravindra Ramanand Warake, Pune (IN); Subrata Bhattacharya, Singapore (SG)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 185 days.

(21) Appl. No.: 17/991,332

(22) Filed: Nov. 21, 2022

(65) Prior Publication Data

US 2023/0164163 A1 May 25, 2023

(30) Foreign Application Priority Data

Nov. 22, 2021 (IN) .............................. 202121053541

(51) Int. Cl.
*H04L 9/40* (2022.01)
*G05B 19/042* (2006.01)

(52) U.S. Cl.
CPC ........ *H04L 63/1433* (2013.01); *G05B 19/042* (2013.01); *H04L 63/1416* (2013.01); *H04L 63/1425* (2013.01); *H04L 63/20* (2013.01); *G05B 2219/25011* (2013.01)

(58) Field of Classification Search
CPC ............. H04L 63/1433; H04L 63/1416; H04L 63/1425; G05B 19/042; G05B 2219/25011
See application file for complete search history.

(56) References Cited

U.S. PATENT DOCUMENTS

| | | | |
|---|---|---|---|
| 5,301,109 | A | 4/1994 | Landauer et al. |
| 5,446,677 | A | 8/1995 | Jensen et al. |
| 5,581,478 | A | 12/1996 | Cruse et al. |
| 5,812,962 | A | 9/1998 | Kovac |
| 5,960,381 | A | 9/1999 | Singers et al. |
| 5,973,662 | A | 10/1999 | Singers et al. |
| 6,014,612 | A | 1/2000 | Larson et al. |
| 6,031,547 | A | 2/2000 | Kennedy |

(Continued)

FOREIGN PATENT DOCUMENTS

| | | |
|---|---|---|
| CN | 101415011 A | 4/2009 |
| CN | 102136099 A | 7/2011 |

(Continued)

OTHER PUBLICATIONS

Balaji et al, "Brick: Metadata schema for portable smart building applications," Applied Energy, 2018 (20 pages).

(Continued)

*Primary Examiner* — Khoi V Le

(74) *Attorney, Agent, or Firm* — Foley & Lardner LLP

(57) ABSTRACT

A system which includes one or more memory devices having instructions stored thereon that, when executed by one or more processors, cause the one or more processors to perform operations. The operations include obtaining first data indicating security characteristics of software or firmware of one or more system devices of a building management system (BMS), obtaining second data indicating security characteristics of a server of the BMS, and calculating a cybersecurity best practices score for the BMS based on the first data and the second data.

16 Claims, 8 Drawing Sheets

(56) References Cited

U.S. PATENT DOCUMENTS

| | | | |
|---|---|---|---|
| 6,134,511 A | 10/2000 | Subbarao |
| 6,157,943 A | 12/2000 | Meyer |
| 6,285,966 B1 | 9/2001 | Brown et al. |
| 6,363,422 B1 | 3/2002 | Hunter et al. |
| 6,385,510 B1 | 5/2002 | Hoog et al. |
| 6,389,331 B1 | 5/2002 | Jensen et al. |
| 6,401,027 B1 | 6/2002 | Xu et al. |
| 6,437,691 B1 | 8/2002 | Sandelman et al. |
| 6,477,518 B1 | 11/2002 | Li et al. |
| 6,487,457 B1 | 11/2002 | Hull et al. |
| 6,493,755 B1 | 12/2002 | Hansen et al. |
| 6,577,323 B1 | 6/2003 | Jamieson et al. |
| 6,626,366 B2 | 9/2003 | Kayahara et al. |
| 6,646,660 B1 | 11/2003 | Patty |
| 6,704,016 B1 | 3/2004 | Oliver et al. |
| 6,732,540 B2 | 5/2004 | Sugihara et al. |
| 6,764,019 B1 | 7/2004 | Kayahara et al. |
| 6,782,385 B2 | 8/2004 | Natsumeda et al. |
| 6,813,532 B2 | 11/2004 | Eryurek et al. |
| 6,816,811 B2 | 11/2004 | Seem |
| 6,823,680 B2 | 11/2004 | Jayanth |
| 6,826,454 B2 | 11/2004 | Sulfstede |
| 6,865,511 B2 | 3/2005 | Frerichs et al. |
| 6,925,338 B2 | 8/2005 | Eryurek et al. |
| 6,986,138 B1 | 1/2006 | Sakaguchi et al. |
| 7,031,880 B1 | 4/2006 | Seem et al. |
| 7,401,057 B2 | 7/2008 | Eder |
| 7,552,467 B2 | 6/2009 | Lindsay |
| 7,627,544 B2 | 12/2009 | Chkodrov et al. |
| 7,818,249 B2 | 10/2010 | Lovejoy et al. |
| 7,889,051 B1 | 2/2011 | Billig et al. |
| 7,996,488 B1 | 8/2011 | Casabella et al. |
| 8,078,330 B2 | 12/2011 | Brickfield et al. |
| 8,104,044 B1 | 1/2012 | Scofield et al. |
| 8,229,470 B1 | 7/2012 | Ranjan et al. |
| 8,401,991 B2 | 3/2013 | Wu et al. |
| 8,495,745 B1 | 7/2013 | Schrecker et al. |
| 8,516,016 B2 | 8/2013 | Park et al. |
| 8,532,808 B2 | 9/2013 | Drees et al. |
| 8,532,839 B2 | 9/2013 | Drees et al. |
| 8,600,556 B2 | 12/2013 | Nesler et al. |
| 8,635,182 B2 | 1/2014 | Mackay |
| 8,682,921 B2 | 3/2014 | Park et al. |
| 8,731,724 B2 | 5/2014 | Drees et al. |
| 8,737,334 B2 | 5/2014 | Ahn et al. |
| 8,738,334 B2 | 5/2014 | Jiang et al. |
| 8,751,487 B2 | 6/2014 | Byrne et al. |
| 8,788,097 B2 | 7/2014 | Drees et al. |
| 8,805,995 B1 | 8/2014 | Oliver |
| 8,843,238 B2 | 9/2014 | Wenzel et al. |
| 8,874,071 B2 | 10/2014 | Sherman et al. |
| 8,941,465 B2 | 1/2015 | Pineau et al. |
| 8,990,127 B2 | 3/2015 | Taylor |
| 9,070,113 B2 | 6/2015 | Shafiee et al. |
| 9,116,978 B2 | 8/2015 | Park et al. |
| 9,185,095 B1 | 11/2015 | Moritz et al. |
| 9,189,527 B2 | 11/2015 | Park et al. |
| 9,196,009 B2 | 11/2015 | Drees et al. |
| 9,229,966 B2 | 1/2016 | Aymeloglu et al. |
| 9,286,582 B2 | 3/2016 | Drees et al. |
| 9,311,807 B2 | 4/2016 | Schultz et al. |
| 9,344,751 B1 | 5/2016 | Ream et al. |
| 9,354,968 B2 | 5/2016 | Wenzel et al. |
| 9,507,686 B2 | 11/2016 | Horn et al. |
| 9,524,594 B2 | 12/2016 | Ouyang et al. |
| 9,558,196 B2 | 1/2017 | Johnston et al. |
| 9,652,813 B2 | 5/2017 | Gifford et al. |
| 9,753,455 B2 | 9/2017 | Drees |
| 9,811,249 B2 | 11/2017 | Chen et al. |
| 9,838,844 B2 | 12/2017 | Emeis et al. |
| 9,886,478 B2 | 2/2018 | Mukherjee |
| 9,948,359 B2 | 4/2018 | Horton |
| 10,055,114 B2 | 8/2018 | Shah et al. |
| 10,055,206 B2 | 8/2018 | Park et al. |
| 10,116,461 B2 | 10/2018 | Fairweather et al. |
| 10,169,454 B2 | 1/2019 | Ait-Mokhtar et al. |
| 10,171,586 B2 | 1/2019 | Shaashua et al. |
| 10,187,258 B2 | 1/2019 | Nagesh et al. |
| 10,514,963 B2 | 12/2019 | Shrivastava et al. |
| 10,515,098 B2 | 12/2019 | Park et al. |
| 10,534,326 B2 | 1/2020 | Sridharan et al. |
| 10,536,295 B2 | 1/2020 | Fairweather et al. |
| 10,705,492 B2 | 7/2020 | Harvey |
| 10,708,078 B2 | 7/2020 | Harvey |
| 10,845,771 B2 | 11/2020 | Harvey |
| 10,854,194 B2 | 12/2020 | Park et al. |
| 10,862,928 B1 | 12/2020 | Badawy et al. |
| 10,921,760 B2 | 2/2021 | Harvey |
| 10,921,972 B2 | 2/2021 | Park et al. |
| 10,969,133 B2 | 4/2021 | Harvey |
| 10,986,121 B2 | 4/2021 | Stockdale et al. |
| 11,016,998 B2 | 5/2021 | Park et al. |
| 11,024,292 B2 | 6/2021 | Park et al. |
| 11,038,709 B2 | 6/2021 | Park et al. |
| 11,070,390 B2 | 7/2021 | Park et al. |
| 11,073,976 B2 | 7/2021 | Park et al. |
| 11,108,587 B2 | 8/2021 | Park et al. |
| 11,113,295 B2 | 9/2021 | Park et al. |
| 11,229,138 B1 | 1/2022 | Harvey et al. |
| 11,314,726 B2 | 4/2022 | Park et al. |
| 11,314,788 B2 | 4/2022 | Park et al. |
| 2002/0010562 A1 | 1/2002 | Schleiss et al. |
| 2002/0016639 A1 | 2/2002 | Smith et al. |
| 2002/0059229 A1 | 5/2002 | Natsumeda et al. |
| 2002/0123864 A1 | 9/2002 | Eryurek et al. |
| 2002/0147506 A1 | 10/2002 | Eryurek et al. |
| 2002/0177909 A1 | 11/2002 | Fu et al. |
| 2003/0005486 A1 | 1/2003 | Ridolfo et al. |
| 2003/0014130 A1 | 1/2003 | Grumelart |
| 2003/0073432 A1 | 4/2003 | Meade, II |
| 2003/0158704 A1 | 8/2003 | Triginai et al. |
| 2003/0171851 A1 | 9/2003 | Brickfield et al. |
| 2003/0200059 A1 | 10/2003 | Ignatowski et al. |
| 2004/0068390 A1 | 4/2004 | Saunders |
| 2004/0128314 A1 | 7/2004 | Katibah et al. |
| 2004/0133314 A1 | 7/2004 | Ehlers et al. |
| 2004/0199360 A1 | 10/2004 | Friman et al. |
| 2005/0055308 A1 | 3/2005 | Meyer et al. |
| 2005/0108262 A1 | 5/2005 | Fawcett et al. |
| 2005/0154494 A1 | 7/2005 | Ahmed |
| 2005/0278703 A1 | 12/2005 | Lo et al. |
| 2005/0283337 A1 | 12/2005 | Sayal |
| 2006/0095521 A1 | 5/2006 | Patinkin |
| 2006/0140207 A1 | 6/2006 | Eschbach et al. |
| 2006/0184479 A1 | 8/2006 | Levine |
| 2006/0200476 A1 | 9/2006 | Gottumukkala et al. |
| 2006/0265751 A1 | 11/2006 | Cosquer et al. |
| 2006/0271589 A1 | 11/2006 | Horowitz et al. |
| 2007/0028179 A1 | 2/2007 | Levin et al. |
| 2007/0203693 A1 | 8/2007 | Estes |
| 2007/0261062 A1 | 11/2007 | Bansal et al. |
| 2007/0273497 A1 | 11/2007 | Kuroda et al. |
| 2007/0273610 A1 | 11/2007 | Baillot |
| 2008/0034425 A1 | 2/2008 | Overcash et al. |
| 2008/0094230 A1 | 4/2008 | Mock et al. |
| 2008/0097816 A1 | 4/2008 | Freire et al. |
| 2008/0186160 A1 | 8/2008 | Kim et al. |
| 2008/0249756 A1 | 10/2008 | Chaisuparasmikul |
| 2008/0252723 A1 | 10/2008 | Park |
| 2008/0281472 A1 | 11/2008 | Podgorny et al. |
| 2009/0195349 A1 | 8/2009 | Frader-Thompson et al. |
| 2010/0045439 A1 | 2/2010 | Tak et al. |
| 2010/0058248 A1 | 3/2010 | Park |
| 2010/0131533 A1 | 5/2010 | Ortiz |
| 2010/0274366 A1 | 10/2010 | Fata et al. |
| 2010/0281387 A1 | 11/2010 | Holland et al. |
| 2010/0286937 A1 | 11/2010 | Hedley et al. |
| 2010/0324962 A1 | 12/2010 | Nesler et al. |
| 2011/0015802 A1 | 1/2011 | Imes |
| 2011/0047418 A1 | 2/2011 | Drees et al. |
| 2011/0061015 A1 | 3/2011 | Drees et al. |
| 2011/0071685 A1 | 3/2011 | Huneycutt et al. |
| 2011/0077950 A1 | 3/2011 | Hughston |
| 2011/0087650 A1 | 4/2011 | Mackay et al. |

(56)        References Cited

U.S. PATENT DOCUMENTS

| | | |
|---|---|---|
| 2011/0087988 A1 | 4/2011 | Ray et al. |
| 2011/0088000 A1 | 4/2011 | Mackay |
| 2011/0125737 A1 | 5/2011 | Pothering et al. |
| 2011/0137853 A1 | 6/2011 | Mackay |
| 2011/0153603 A1 | 6/2011 | Adiba et al. |
| 2011/0154363 A1 | 6/2011 | Karmarkar |
| 2011/0157357 A1 | 6/2011 | Weisensale et al. |
| 2011/0178977 A1 | 7/2011 | Drees |
| 2011/0191343 A1 | 8/2011 | Heaton et al. |
| 2011/0205022 A1 | 8/2011 | Cavallaro et al. |
| 2011/0218777 A1 | 9/2011 | Chen et al. |
| 2012/0011126 A1 | 1/2012 | Park et al. |
| 2012/0011141 A1 | 1/2012 | Park et al. |
| 2012/0022698 A1 | 1/2012 | Mackay |
| 2012/0062577 A1 | 3/2012 | Nixon |
| 2012/0064923 A1 | 3/2012 | Imes et al. |
| 2012/0083930 A1 | 4/2012 | Ilic et al. |
| 2012/0100825 A1 | 4/2012 | Sherman et al. |
| 2012/0101637 A1 | 4/2012 | Imes et al. |
| 2012/0135759 A1 | 5/2012 | Imes et al. |
| 2012/0136485 A1 | 5/2012 | Weber et al. |
| 2012/0158633 A1 | 6/2012 | Eder |
| 2012/0259583 A1 | 10/2012 | Noboa et al. |
| 2012/0272228 A1 | 10/2012 | Marndi et al. |
| 2012/0278051 A1 | 11/2012 | Jiang et al. |
| 2013/0007063 A1 | 1/2013 | Kalra et al. |
| 2013/0038430 A1 | 2/2013 | Blower et al. |
| 2013/0038707 A1 | 2/2013 | Cunningham et al. |
| 2013/0060820 A1 | 3/2013 | Bulusu et al. |
| 2013/0086497 A1 | 4/2013 | Ambuhl et al. |
| 2013/0097706 A1 | 4/2013 | Titonis et al. |
| 2013/0103221 A1 | 4/2013 | Raman et al. |
| 2013/0167035 A1 | 6/2013 | Imes et al. |
| 2013/0170710 A1 | 7/2013 | Kuoch et al. |
| 2013/0204836 A1 | 8/2013 | Choi et al. |
| 2013/0246916 A1 | 9/2013 | Reimann et al. |
| 2013/0247205 A1 | 9/2013 | Schrecker et al. |
| 2013/0262035 A1 | 10/2013 | Mills |
| 2013/0275174 A1 | 10/2013 | Bennett et al. |
| 2013/0275908 A1 | 10/2013 | Reichard |
| 2013/0297050 A1 | 11/2013 | Reichard et al. |
| 2013/0298244 A1 | 11/2013 | Kumar et al. |
| 2013/0331995 A1 | 12/2013 | Rosen |
| 2014/0032506 A1 | 1/2014 | Hoey et al. |
| 2014/0059483 A1 | 2/2014 | Mairs et al. |
| 2014/0081652 A1 | 3/2014 | Klindworth |
| 2014/0135952 A1 | 5/2014 | Maehara |
| 2014/0152651 A1 | 6/2014 | Chen et al. |
| 2014/0172184 A1* | 6/2014 | Schmidt ................. G06Q 50/06 |
| | | 700/295 |
| 2014/0189861 A1 | 7/2014 | Gupta et al. |
| 2014/0207282 A1 | 7/2014 | Angle et al. |
| 2014/0258052 A1 | 9/2014 | Khuti et al. |
| 2014/0269614 A1* | 9/2014 | Maguire ............... H04L 67/125 |
| | | 370/331 |
| 2014/0277765 A1 | 9/2014 | Karimi et al. |
| 2014/0278461 A1 | 9/2014 | Artz |
| 2014/0327555 A1 | 11/2014 | Sager et al. |
| 2015/0019174 A1 | 1/2015 | Kiff et al. |
| 2015/0042240 A1 | 2/2015 | Aggarwal et al. |
| 2015/0105917 A1 | 4/2015 | Sasaki et al. |
| 2015/0145468 A1 | 5/2015 | Ma et al. |
| 2015/0156031 A1 | 6/2015 | Fadell et al. |
| 2015/0168931 A1 | 6/2015 | Jin |
| 2015/0172300 A1 | 6/2015 | Cochenour |
| 2015/0178421 A1 | 6/2015 | Borrelli et al. |
| 2015/0185261 A1 | 7/2015 | Frader-Thompson et al. |
| 2015/0186777 A1 | 7/2015 | Lecue et al. |
| 2015/0202962 A1 | 7/2015 | Habashima et al. |
| 2015/0204563 A1 | 7/2015 | Imes et al. |
| 2015/0235267 A1 | 8/2015 | Steube et al. |
| 2015/0241895 A1 | 8/2015 | Lu et al. |
| 2015/0244730 A1 | 8/2015 | Vu et al. |
| 2015/0244732 A1 | 8/2015 | Golshan et al. |
| 2015/0261863 A1 | 9/2015 | Dey et al. |
| 2015/0263900 A1 | 9/2015 | Polyakov et al. |
| 2015/0286969 A1 | 10/2015 | Warner et al. |
| 2015/0295796 A1 | 10/2015 | Hsiao et al. |
| 2015/0304193 A1 | 10/2015 | Ishii et al. |
| 2015/0316918 A1 | 11/2015 | Schleiss et al. |
| 2015/0324422 A1 | 11/2015 | Elder |
| 2015/0341212 A1 | 11/2015 | Hsiao et al. |
| 2015/0348417 A1 | 12/2015 | Ignaczak et al. |
| 2015/0379080 A1 | 12/2015 | Jochimski |
| 2016/0011753 A1 | 1/2016 | Mcfarland et al. |
| 2016/0033946 A1 | 2/2016 | Zhu et al. |
| 2016/0035246 A1 | 2/2016 | Curtis |
| 2016/0065601 A1 | 3/2016 | Gong et al. |
| 2016/0070736 A1 | 3/2016 | Swan et al. |
| 2016/0078229 A1 | 3/2016 | Gong et al. |
| 2016/0090839 A1 | 3/2016 | Stolarczyk |
| 2016/0119434 A1 | 4/2016 | Dong et al. |
| 2016/0127712 A1 | 5/2016 | Alfredsson et al. |
| 2016/0139752 A1 | 5/2016 | Shim et al. |
| 2016/0163186 A1 | 6/2016 | Davidson et al. |
| 2016/0170390 A1 | 6/2016 | Xie et al. |
| 2016/0171862 A1 | 6/2016 | Das et al. |
| 2016/0173816 A1 | 6/2016 | Huenerfauth et al. |
| 2016/0179315 A1 | 6/2016 | Sarao et al. |
| 2016/0179342 A1 | 6/2016 | Sarao et al. |
| 2016/0179990 A1 | 6/2016 | Sarao et al. |
| 2016/0195856 A1 | 7/2016 | Spero |
| 2016/0212165 A1 | 7/2016 | Singla et al. |
| 2016/0239660 A1 | 8/2016 | Azvine et al. |
| 2016/0239756 A1 | 8/2016 | Aggour et al. |
| 2016/0313751 A1 | 10/2016 | Risbeck et al. |
| 2016/0313752 A1 | 10/2016 | Przybylski |
| 2016/0313902 A1 | 10/2016 | Hill et al. |
| 2016/0350364 A1 | 12/2016 | Anicic et al. |
| 2016/0357828 A1 | 12/2016 | Tobin et al. |
| 2016/0358432 A1 | 12/2016 | Branscomb et al. |
| 2016/0363336 A1 | 12/2016 | Roth et al. |
| 2016/0370258 A1 | 12/2016 | Perez |
| 2016/0378306 A1 | 12/2016 | Kresl et al. |
| 2016/0379326 A1 | 12/2016 | Chan-Gove et al. |
| 2017/0006135 A1 | 1/2017 | Siebel |
| 2017/0011318 A1 | 1/2017 | Vigano et al. |
| 2017/0017221 A1 | 1/2017 | Lamparter et al. |
| 2017/0039255 A1 | 2/2017 | Raj et al. |
| 2017/0052536 A1 | 2/2017 | Warner et al. |
| 2017/0053441 A1 | 2/2017 | Nadumane et al. |
| 2017/0063894 A1 | 3/2017 | Muddu et al. |
| 2017/0068409 A1 | 3/2017 | Nair |
| 2017/0070775 A1 | 3/2017 | Taxier et al. |
| 2017/0075984 A1 | 3/2017 | Deshpande et al. |
| 2017/0084168 A1 | 3/2017 | Janchookiat |
| 2017/0090437 A1 | 3/2017 | Veeramani et al. |
| 2017/0093700 A1 | 3/2017 | Gilley et al. |
| 2017/0098086 A1 | 4/2017 | Hoernecke et al. |
| 2017/0103327 A1 | 4/2017 | Penilla et al. |
| 2017/0103403 A1 | 4/2017 | Chu et al. |
| 2017/0123389 A1 | 5/2017 | Baez et al. |
| 2017/0134415 A1 | 5/2017 | Muddu et al. |
| 2017/0177715 A1 | 6/2017 | Chang et al. |
| 2017/0180147 A1 | 6/2017 | Brandman et al. |
| 2017/0188216 A1 | 6/2017 | Koskas et al. |
| 2017/0212482 A1 | 7/2017 | Boettcher et al. |
| 2017/0212668 A1 | 7/2017 | Shah et al. |
| 2017/0220641 A1 | 8/2017 | Chi et al. |
| 2017/0230930 A1 | 8/2017 | Frey |
| 2017/0235817 A1 | 8/2017 | Deodhar et al. |
| 2017/0251182 A1 | 8/2017 | Siminoff et al. |
| 2017/0270124 A1 | 9/2017 | Nagano et al. |
| 2017/0277769 A1 | 9/2017 | Pasupathy et al. |
| 2017/0278003 A1 | 9/2017 | Liu |
| 2017/0294132 A1 | 10/2017 | Colmenares |
| 2017/0315522 A1 | 11/2017 | Kwon et al. |
| 2017/0315697 A1 | 11/2017 | Jacobson et al. |
| 2017/0322534 A1 | 11/2017 | Sinha et al. |
| 2017/0323389 A1 | 11/2017 | Vavrasek |
| 2017/0329289 A1 | 11/2017 | Kohn et al. |
| 2017/0336770 A1 | 11/2017 | Macmillan |
| 2017/0345287 A1 | 11/2017 | Fuller et al. |
| 2017/0351957 A1 | 12/2017 | Lecue et al. |

(56) References Cited

U.S. PATENT DOCUMENTS

| | | |
|---|---|---|
| 2017/0357225 A1 | 12/2017 | Asp et al. |
| 2017/0357490 A1 | 12/2017 | Park et al. |
| 2017/0357908 A1 | 12/2017 | Cabadi et al. |
| 2018/0012159 A1 | 1/2018 | Kozloski et al. |
| 2018/0013579 A1 | 1/2018 | Fairweather et al. |
| 2018/0024520 A1 | 1/2018 | Sinha et al. |
| 2018/0039238 A1 | 2/2018 | Gärtner et al. |
| 2018/0048485 A1 | 2/2018 | Pelton et al. |
| 2018/0069932 A1 | 3/2018 | Tiwari et al. |
| 2018/0114140 A1 | 4/2018 | Chen et al. |
| 2018/0137288 A1 | 5/2018 | Polyakov |
| 2018/0157930 A1 | 6/2018 | Rutschman et al. |
| 2018/0162400 A1 | 6/2018 | Abdar |
| 2018/0176241 A1 | 6/2018 | Manadhata et al. |
| 2018/0198627 A1 | 7/2018 | Mullins |
| 2018/0203961 A1 | 7/2018 | Aisu et al. |
| 2018/0239982 A1 | 8/2018 | Rutschman et al. |
| 2018/0275625 A1 | 9/2018 | Park et al. |
| 2018/0276962 A1 | 9/2018 | Butler et al. |
| 2018/0292797 A1 | 10/2018 | Lamparter et al. |
| 2018/0336785 A1 | 11/2018 | Ghannam et al. |
| 2018/0359111 A1 | 12/2018 | Harvey |
| 2018/0364654 A1 | 12/2018 | Locke et al. |
| 2019/0005025 A1 | 1/2019 | Malabarba |
| 2019/0013023 A1 | 1/2019 | Pourmohammad et al. |
| 2019/0025771 A1 | 1/2019 | Park et al. |
| 2019/0037135 A1 | 1/2019 | Hedge |
| 2019/0042988 A1 | 2/2019 | Brown et al. |
| 2019/0088106 A1 | 3/2019 | Grundstrom |
| 2019/0094824 A1 | 3/2019 | Xie et al. |
| 2019/0096217 A1 | 3/2019 | Pourmohammad et al. |
| 2019/0102840 A1 | 4/2019 | Perl et al. |
| 2019/0138512 A1 | 5/2019 | Pourmohammad et al. |
| 2019/0147883 A1 | 5/2019 | Mellenthin et al. |
| 2019/0158309 A1* | 5/2019 | Park ................... H04L 12/2812 |
| 2019/0163152 A1 | 5/2019 | Worrall et al. |
| 2019/0268178 A1 | 8/2019 | Fairweather et al. |
| 2019/0310979 A1 | 10/2019 | Masuzaki et al. |
| 2020/0226156 A1 | 7/2020 | Borra et al. |
| 2020/0285203 A1 | 9/2020 | Thakur et al. |
| 2021/0042299 A1 | 2/2021 | Migliori |
| 2021/0334386 A1* | 10/2021 | AlGhamdi .......... H04L 63/1433 |
| 2021/0342961 A1 | 11/2021 | Winter et al. |
| 2021/0381711 A1 | 12/2021 | Harvey et al. |
| 2021/0381712 A1 | 12/2021 | Harvey et al. |
| 2021/0382445 A1 | 12/2021 | Harvey et al. |
| 2021/0383041 A1 | 12/2021 | Harvey et al. |
| 2021/0383042 A1 | 12/2021 | Harvey et al. |
| 2021/0383200 A1 | 12/2021 | Harvey et al. |
| 2021/0383219 A1 | 12/2021 | Harvey et al. |
| 2021/0383235 A1 | 12/2021 | Harvey et al. |
| 2021/0383236 A1 | 12/2021 | Harvey et al. |
| 2022/0066402 A1 | 3/2022 | Harvey et al. |
| 2022/0066405 A1 | 3/2022 | Harvey |
| 2022/0066432 A1 | 3/2022 | Harvey et al. |
| 2022/0066434 A1 | 3/2022 | Harvey et al. |
| 2022/0066528 A1 | 3/2022 | Harvey et al. |
| 2022/0066722 A1 | 3/2022 | Harvey et al. |
| 2022/0066754 A1 | 3/2022 | Harvey et al. |
| 2022/0066761 A1 | 3/2022 | Harvey et al. |
| 2022/0067226 A1 | 3/2022 | Harvey et al. |
| 2022/0067227 A1 | 3/2022 | Harvey et al. |
| 2022/0067230 A1 | 3/2022 | Harvey et al. |
| 2022/0069863 A1 | 3/2022 | Harvey et al. |
| 2022/0070293 A1 | 3/2022 | Harvey et al. |
| 2022/0138684 A1 | 5/2022 | Harvey |
| 2022/0215264 A1 | 7/2022 | Harvey et al. |
| 2023/0010757 A1 | 1/2023 | Preciado |

FOREIGN PATENT DOCUMENTS

| | | | |
|---|---|---|---|
| CN | 102136100 A | 7/2011 |
| CN | 102650876 A | 8/2012 |
| CN | 104040583 A | 9/2014 |
| CN | 104603832 A | 5/2015 |
| CN | 104919484 A | 9/2015 |
| CN | 106204392 A | 12/2016 |
| CN | 106406806 A | 2/2017 |
| CN | 106960269 A | 7/2017 |
| CN | 107147639 A1 | 9/2017 |
| CN | 107598928 A | 1/2018 |
| EP | 2 528 033 A1 | 11/2012 |
| EP | 3 324 306 A1 | 5/2018 |
| JP | H10-049552 A | 2/1998 |
| JP | 2003-162573 A | 6/2003 |
| JP | 2007-018322 A | 1/2007 |
| JP | 4073946 B1 | 4/2008 |
| JP | 2008-107930 A | 5/2008 |
| JP | 2013-152618 A | 8/2013 |
| JP | 2014-044457 A | 3/2014 |
| KR | 2016/0102923 A | 8/2016 |
| WO | WO-2009/020158 A1 | 2/2009 |
| WO | WO-2011/100255 A2 | 8/2011 |
| WO | WO-2013/050333 A1 | 4/2013 |
| WO | WO-2015/106702 A1 | 7/2015 |
| WO | WO-2015/145648 A1 | 10/2015 |
| WO | WO-2017/035536 A1 | 3/2017 |
| WO | WO-2017/192422 A1 | 11/2017 |
| WO | WO-2017/194244 A1 | 11/2017 |
| WO | WO-2017/205330 A1 | 11/2017 |
| WO | WO-2017/213918 A1 | 12/2017 |

OTHER PUBLICATIONS

Balaji et al, "Brick: Metadata schema for portable smart building applications," Applied Energy, Sep. 15, 2018, 3 pages, (Abstract).
Balaji et al, "Demo Abstract: Portable Queries Using the Brick Schema for Building Applications," BuildSys '16, Palo Alto, CA, USA, Nov. 16-17, 2016 (2 pages).
Balaji, B. et al., "Brick: Towards a Unified Metadata Schema For Buildings." BuildSys '16, Palo Alto, CA, USA, Nov. 16-17, 2016 (10 pages).
Bhattacharya et al., "Short Paper: Analyzing Metadata Schemas for Buildings—The Good, The Bad and The Ugly," BuildSys '15, Seoul, South Korea, Nov. 4-5, 2015 (4 pages).
Bhattacharya, A., "Enabling Scalable Smart-Building Analytics," Electrical Engineering and Computer Sciences, University of California at Berkeley, Technical Report No. UCB/EECS-2016-201, Dec. 15, 2016 (121 pages).
Brick, "Brick Schema: Building Blocks for Smart Buildings," URL: chrome-extension://efaidnbmnnnibpcajpcglclefindmkaj/https://www.memoori.com/wp-content/uploads/2016/06/Brick_Schema_Whitepaper.pdf, Mar. 2019 (17 pages).
Brick, "Brick: Towards a Unified Metadata Schema For Buildings," URL: chrome-extension://efaidnbmnnnibpcajpcglclefindmkaj/https://brickschema.org/papers/Brick_BuildSys_Presentation.pdf, Presented at BuildSys '16, Nov. 2016 (46 pages).
Brick, "Metadata Schema for Buildings," URL: https://brickschema.org/docs/Brick-Leaflet.pdf, retrieved from internet Dec. 24, 2019 (3 pages).
Chinese Office Action on CN Appl. No. 201780003995.9 dated Apr. 8, 2021 (21 pages with English language translation).
Chinese Office action on CN Appl. No. 201780043400.2 dated Apr. 25, 2021 (15 pages with English language translation).
Curry, E. et al., "Linking building data in the cloud: Integrating cross-domain building data using linked data." Advanced Engineering Informatics, 2013, 27 (pp. 206-219).
Digital Platform Litigation Documents Part 1, includes cover letter, dismissal of case DDE-1-21-cv-01796, IPR2023-00022 (documents filed Jan. 26, 2023-Oct. 7, 2022), and IPR2023-00085 (documents filed Jan. 26, 2023-Oct. 20, 2022) (748 pages total).
Digital Platform Litigation Documents Part 10, includes DDE-1-21-cv-01796 (documents filed Nov. 1, 2022-Dec. 22, 2021 (1795 pages total).
Digital Platform Litigation Documents Part 2, includes IPR2023-00085 (documents filed Oct. 20, 2022) (172 pages total).
Digital Platform Litigation Documents Part 3, includes IPR2023-00085 (documents filed Oct. 20, 2022) and IPR2023-00170 (documents filed Nov. 28, 2022-Nov. 7, 2022) (397 pages total).

(56)          References Cited

OTHER PUBLICATIONS

Digital Platform Litigation Documents Part 4, includes IPR2023-00170 (documents filed Nov. 7, 2022) and IPR2023-00217 (documents filed Jan. 18, 2023-Nov. 15, 2022) (434 pages total).

Digital Platform Litigation Documents Part 5, includes IPR2023-00217 (documents filed Nov. 15, 2022) and IPR2023-00257 (documents filed Jan. 25, 2023-Nov. 23, 2022) (316 pages total).

Digital Platform Litigation Documents Part 6, includes IPR2023-00257 (documents filed Nov. 23, 2022) and IPR 2023-00346 (documents filed Jan. 3, 2023-Dec. 13, 2022) (295 pages total).

Digital Platform Litigation Documents Part 7, includes IPR 2023-00346 (documents filed Dec. 13, 2022) and IPR2023-00347 (documents filed Jan. 3, 2023-Dec. 13, 2022) (217 pages total).

Digital Platform Litigation Documents Part 8, includes IPR2023-00347 (documents filed Dec. 13, 2022), EDTX-2-22-cv-00243 (documents filed Sep. 20, 2022-Jun. 29, 2022), and DDE-1-21-cv-01796 (documents filed Feb. 3, 2023-Jan. 10, 2023 (480 pages total).

Digital Platform Litigation Documents Part 9, includes DDE-1-21-cv-01796 (documents filed Jan. 10, 2023-Nov. 1, 2022 (203 pages total).

El Kaed, C. et al., "Building management insights driven by a multi-system semantic representation approach," 2016 IEEE 3rd World Forum on Internet of Things (WF-IoT), Dec. 12-14, 2016, (pp. 520-525).

Ellis, C. et al., "Creating a room connectivity graph of a building from per-room sensor units." BuildSys '12, Toronto, ON, Canada, Nov. 6, 2012 (7 pages).

Extended European Search Report on EP Application No. 18196948.6 dated Apr. 10, 2019 (9 pages).

Fierro et al., "Beyond a House of Sticks: Formalizing Metadata Tags with Brick, " BuildSys '19, New York, NY, USA, Nov. 13-14, 2019 (10 pages).

Fierro et al., "Dataset: An Open Dataset and Collection Tool for BMS Point Labels," DATA'19, New York, NY, USA, Nov. 10, 2019 (3 pages).

Fierro et al., "Design and Analysis of a Query Processor for Brick," ACM Transactions on Sensor Networks, Jan. 2018, vol. 1, No. 1, art. 1 (25 pages).

Fierro et al., "Design and Analysis of a Query Processor for Brick," BuildSys '17, Delft, Netherlands, Nov. 8-9, 2017 (10 pages).

Fierro et al., "Mortar: An Open Testbed for Portable Building Analytics," BuildSys '18, Shenzhen, China, Nov. 7-8, 2018 (10 pages).

Fierro et al., "Why Brick is a Game Changer for Smart Buildings," URL: https://brickschema.org/papers/Brick_Memoori_Webinar_Presentation.pdf, Memoori Webinar, 2019 (67 pages).

Fierro, "Writing Portable Building Analytics with the Brick Metadata Schema," UC Berkeley, ACM E-Energy, 2019 (39 pages).

Fierro, G., "Design of an Effective Ontology and Query Processor Enabling Portable Building Applications," Electrical Engineering and Computer Sciences, University of California at Berkeley, Technical Report No. UCB/EECS-2019-106, Jun. 27, 2019 (118 pages).

File History for U.S. Appl. 12/776,159, filed May 7, 2010 (722 pages).

Final Conference Program, ACM BuildSys 2016, Stanford, CA, USA, Nov. 15-17, 2016 (7 pages).

Gao et al., "A large-scale evaluation of automated metadata inference approaches on sensors from air handling units," Advanced Engineering Informatics, 2018, 37 (pp. 14-30).

Harvey, T., "Quantum Part 3: The Tools of Autonomy, How PassiveLogic's Quantum Creator and Autonomy Studio software works," URL: https://www.automatedbuildings.com/news/jan22/articles/passive/211224010000passive.html, Jan. 2022 (7 pages).

Harvey, T., "Quantum: The Digital Twin Standard for Buildings," URL: https://www.automatedbuildings.com/news/feb21/articles/passivelogic/210127124501passivelogic.html, Feb. 2021 (6 pages).

Hu, S. et al., "Building performance optimisation: A hybrid architecture for the integration of contextual information and time-series data," Automation in Construction, 2016, 70 (pp. 51-61).

International Search Report and Written Opinion for PCT Appl. Ser. No. PCT/US2017/013831 dated Mar. 31, 2017 (14 pages).

International Search Report and Written Opinion for PCT Appl. Ser. No. PCT/US2017/035524 dated Jul. 24, 2017 (14 pages).

International Search Report and Written Opinion on PCT/US2017/052060, mailed Oct. 5, 2017, 11 pages.

International Search Report and Written Opinion on PCT/US2017/052633, mailed Oct. 23, 2017, 9 pages.

International Search Report and Written Opinion on PCT/US2017/052829, mailed Nov. 27, 2017, 24 pages.

International Search Report and Written Opinion on PCT/US2018/024068, mailed Jun. 15, 2018, 22 pages.

International Search Report and Written Opinion on PCT/US2018/052971, dated Mar. 1, 2019, 19 pages.

International Search Report and Written Opinion on PCT/US2018/052974, mailed Dec. 19, 2018, 13 pages.

International Search Report and Written Opinion on PCT/US2018/052975, mailed Jan. 2, 2019, 13 pages.

International Search Report and Written Opinion on PCT/US2018/052994, mailed Jan. 7, 2019, 15 pages.

International Search Report and Written Opinion on PCT/US2019/015481, dated May 17, 2019, 78 pages.

International Search Report and Written Opinion on PCT/US2020/058381, dated Jan. 27, 2021, 30 pages.

Japanese Office Action on JP Appl. No. 2018-534963 dated May 11, 2021 (16 pages with English language translation).

Koh et al., "Plaster: An Integration, Benchmark, and Development Framework for Metadata Normalization Methods," BuildSys '18, Shenzhen, China, Nov. 7-8, 2018 (10 pages).

Koh et al., "Scrabble: Transferrable Semi-Automated Semantic Metadata Normalization using Intermediate Representation," BuildSys '18, Shenzhen, China, Nov. 7-8, 2018 (10 pages).

Koh et al., "Who can Access What, and When?" BuildSys '19, New York, NY, USA, Nov. 13-14, 2019 (4 pages).

Li et al., "Event Stream Processing with Out-of-Order Data Arrival," International Conferences on Distributed Computing Systems, 2007, (8 pages).

Nissin Electric Co., Ltd., "Smart power supply system (SPSS)," Outline of the scale verification plan, Nissin Electric Technical Report, Japan, Apr. 23, 2014, vol. 59, No. 1 (23 pages).

Passivelogic, "Explorer: Digital Twin Standard for Autonomous Systems. Made interactive." URL: https://passivelogic.com/software/quantum-explorer/, retrieved from internet Jan. 4, 2023 (13 pages).

Passivelogic, "Quantum: The Digital Twin Standard for Autonomous Systems, A physics-based ontology for next-generation control and AI." URL: https://passivelogic.com/software/quantum-standard/, retrieved from internet Jan. 4, 2023 (20 pages).

Quantum Alliance, "Quantum Explorer Walkthrough," 2022, (7 pages) (screenshots from video).

Results of the Partial International Search for PCT/US2018/052971, dated Jan. 3, 2019, 3 pages.

Sinha, Sudhi and Al Huraimel, Khaled, "Reimagining Businesses with AI" John Wiley & Sons, Inc., Hoboken, NJ, USA, 2021 (156 pages).

Sinha, Sudhi R. and Park, Youngchoon, "Building an Effective IoT Ecosystem for Your Business," Johnson Controls International, Springer International Publishing, 2017 (286 pages).

Sinha, Sudhi, "Making Big Data Work For Your Business: A guide to effective Big Data analytics," Impackt Publishing LTD., Birmingham, UK, Oct. 2014 (170 pages).

The Virtual Nuclear Tourist, "Calvert Cliffs Nuclear Power Plant," URL: http://www.nucleartourist.com/us/calvert.htm, Jan. 11, 2006 (2 pages).

University of California at Berkeley, EECS Department, "Enabling Scalable Smart-Building Analytics," URL: https://www2.eecs.berkeley.edu/Pubs/TechRpts/2016/EECS-2016-201.html, retrieved from internet Feb. 15, 2022 (7 pages).

Van Hoof, Bert, "Announcing Azure Digital Twins: Create digital replicas of spaces and infrastructure using cloud, AI and IoT," URL: https://azure.microsoft.com/en-us/blog/announcing-azure-digital-

(56)     References Cited

OTHER PUBLICATIONS twins-create-digital-replicas-of-spaces-and-infrastructure-using-cloud-ai-and-iot/, Sep. 24, 2018 (11 pages).

W3C, "SPARQL: Query Language for RDF," located on The Wayback Machine, URL: https://web.archive.org/web/20161230061728/ http://www.w3.org/TR/rdf-sparql-query/), retrieved from internet Nov. 15, 2022 (89 pages).

Wei et al., "Development and Implementation of Software Gateways of Fire Fighting Subsystem Running on EBI," Control, Automation and Systems Engineering, IITA International Conference on, IEEE, Jul. 2009 (pp. 9-12).

Zhou, Q. et al., "Knowledge-infused and Consistent Complex Event Processing over Real-time and Persistent Streams," Further Generation Computer Systems, 2017, 76 (pp. 391-406).

* cited by examiner

700

| Description | Total count | Total deviation count | Ideal score | Penalty score | Actual Score Calculation | Actual Score | Actual Overall Score |
|---|---|---|---|---|---|---|---|
| BMS Device Security Status | | | | | Allocated Overall Score | 20 | |
| BMS Server Version is up to date | 1 | 1 | 10 | 10 | Penalty score = ( Ideal score / total no. of controller) * no. of controller with outdated firmware | 0 | |
| Supervisory Firmware up to date | 10 | 0 | 6 | 0 | Penalty score = ( Ideal score / total no. of controller) * no. of controller with outdated firmware | 6 | 9.3 |
| Field Controller firmware up to date | 40 | 7 | 4 | 0.7 | Penalty score = ( Ideal score / total no. of controller) * no. of controller with outdated firmware | 3.3 | |
| ADS Server Security Status | | | | | Allocated Overall Score | 40 | |
| Server OS up to date | 1 | 0 | 3 | 0 | Penalty score = Ideal score if actual version is older than expected version | 3 | |
| OS auto update enable status | 1 | 0 | 5 | 0 | Penalty score = Ideal score if OS auto update status is disabled | 5 | |
| Firewall enable/disable status | 1 | 0 | 10 | 0 | Penalty score = Ideal score if firewall status is disabled | 10 | |
| Firewall disabled duration | 1 | 0 | 2 | 0 | Penalty score = 0.1 increment per 5 seconds firewall disable duration | 2 | 27.0 |
| Antivirus installed | 1 | 0 | 5 | 0 | Penalty score = Ideal score if no antivirus installed | 5 | |
| Antivirus Auto update status | 1 | 1 | 2 | 2 | Penalty score = Ideal score if antivirus auto update is disabled | 0 | |
| USB port enable/disable status | 1 | 1 | 5 | 5 | Penalty score = Ideal score if USB ports are enabled | 0 | |
| USB port usage duration | 1 | 1 | 2 | 2 | Penalty score = 0.1 increment per 30 seconds USB port in use | 0 | |
| New application installed | 1 | 1 | 2 | 2 | Penalty score = Ideal score if new application is installed in 24 hours | 0 | |
| User Password change policy status | 1 | 0 | 2 | 0 | Penalty score = Ideal score no user password change policy in place | 2 | |
| Auto log off policy | 1 | 1 | 2 | 2 | Penalty score = Ideal score no auto log off policy in place | 0 | |
| Connectivity Security Status | | | | | Allocated Overall Score | 40 | |
| BMS devices behind customer hardware firewall | 1 | 0 | 5 | 0 | Penalty score = Ideal score if BMS devices are not behind hardware firewall | 5 | |
| Modem firewall status | 1 | 0 | 10 | 0 | Penalty score = Ideal score if modem firewall is disabled at any point of time | 10 | |
| Port blocking configured | 1 | 0 | 5 | 0 | Penalty score = Ideal score if modem port blocking is disabled at any point of time | 5 | |
| Modem firmware up to date | 1 | 0 | 4 | 0 | Penalty score = Ideal score if modem firewall is not up to date | 4 | 38.0 |
| Modem pen testing status | 1 | 0 | 10 | 0 | Penalty score = Ideal score if modem pen testing is not done | 10 | |
| Data upload download pattern | 1 | 1 | 2 | 2 | Penalty score = Ideal score if data upload/download deviates 20% more than usual consumption | 0 | |
| Unauthorized user login alert | 1 | 0 | 2 | 0 | Penalty score = Ideal score if unauthorized person trying to access site | 2 | |
| Remote user management | 1 | 0 | 2 | 0 | Penalty score = ( Ideal score / total no. of controller) * no. of controller with outdated firmware | 2 | |
| CBPS | | | | | | | 74.30 |

FIG. 7

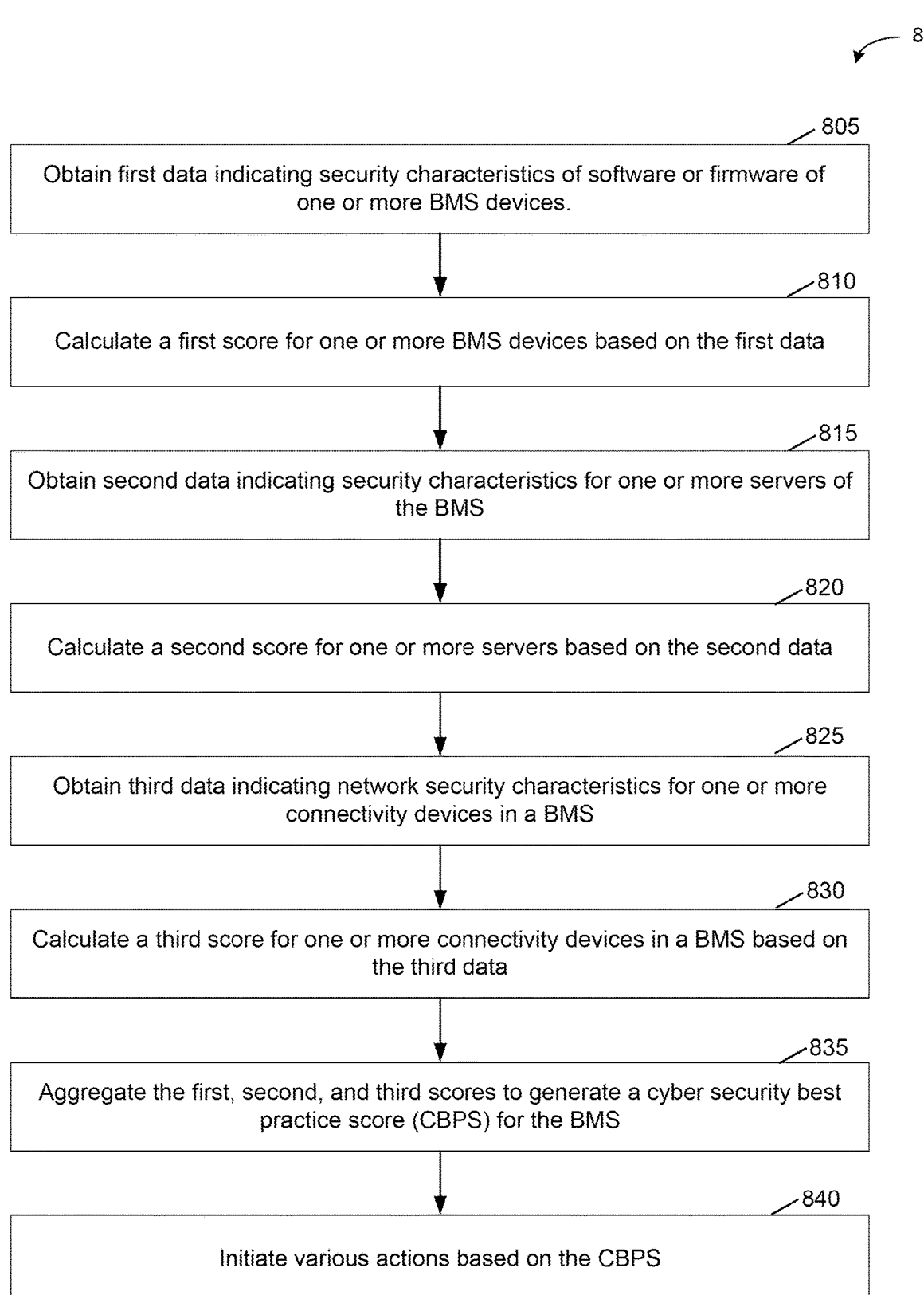

— 800

805

Obtain first data indicating security characteristics of software or firmware of one or more BMS devices.

810

Calculate a first score for one or more BMS devices based on the first data

815

Obtain second data indicating security characteristics for one or more servers of the BMS

820

Calculate a second score for one or more servers based on the second data

825

Obtain third data indicating network security characteristics for one or more connectivity devices in a BMS

830

Calculate a third score for one or more connectivity devices in a BMS based on the third data

835

Aggregate the first, second, and third scores to generate a cyber security best practice score (CBPS) for the BMS

840

Initiate various actions based on the CBPS

FIG. 8

BUILDING MANAGEMENT SYSTEM CYBERSECURITY INDEX

BACKGROUND

This application claims the benefit of and priority to Indian Provisional Patent Application No. 202121053541, filed Nov. 22, 2021, the entirety of which is incorporated by reference herein.

BACKGROUND

The present disclosure relates generally to building management systems (BMSs) and, more specifically, to determining a cybersecurity best practices score (CBPS) for BMSs (e.g., indicative of the overall level of cybersecurity within a BMS).

In various implementations, a BMS operates by monitoring and controlling a wide variety building subsystems and equipment. A BMS can improve building operations, and can allow building owners or operators to meeting various operating goals, by increasing building (e.g., system and equipment) efficiency, decreasing operating costs, reducing user input (e.g., through automation), reducing downtime, etc. However, cybersecurity problems within a BMS can leave the BMS susceptible to attack, which can cause the BMS to malfunction or expose sensitive data from the BMS. Additionally, it may not be apparent which cybersecurity problems are affecting the BMS. Therefore, it would be desirable to provide a mechanism for quantifying the cybersecurity of a BMS and identifying when there are cybersecurity issues that leave the BMS system open to attack.

SUMMARY

One implementation of the present disclosure is a system. The system includes one or more memory devices having instructions stored thereon that, when executed by one or more processors, cause the one or more processors to perform operations. The operations include obtaining first data indicating security characteristics of software or firmware of one or more system devices of a building management system (BMS), obtaining second data indicating security characteristics of a server of the BMS, and calculating a cybersecurity best practices score for the BMS based on the first data and the second data.

Another implementation of the present disclosure is a method. The method includes obtaining first data indicating security characteristics of software or firmware of one or more system devices of a building management system (BMS), obtaining second data indicating security characteristics of a server of the BMS, obtaining third data indicating network security characteristics of the BMS, calculating a cybersecurity best practices score for the BMS based on the first data, the second data, and the third data.

Yet another implementation of the present disclosure is a non-transitory computer-readable media comprising computer-readable instructions stored thereon that when executed by a processor cause the processor to perform operations. The operations include obtaining first data indicating security characteristics of software or firmware of one or more system devices of a building management system (BMS), obtaining second data indicating security characteristics of a server of the BMS, obtaining third data indicating network security characteristics of the BMS, calculating a cybersecurity best practices score for the BMS based on the first data, the second data, and the third data.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 7 is an example graph for calculating the CBPS of a BMS, according to some embodiments.

FIG. 8 is a process for calculating a CBPS value for a BMS, according to some embodiments.

DETAILED DESCRIPTION

Figure 1:
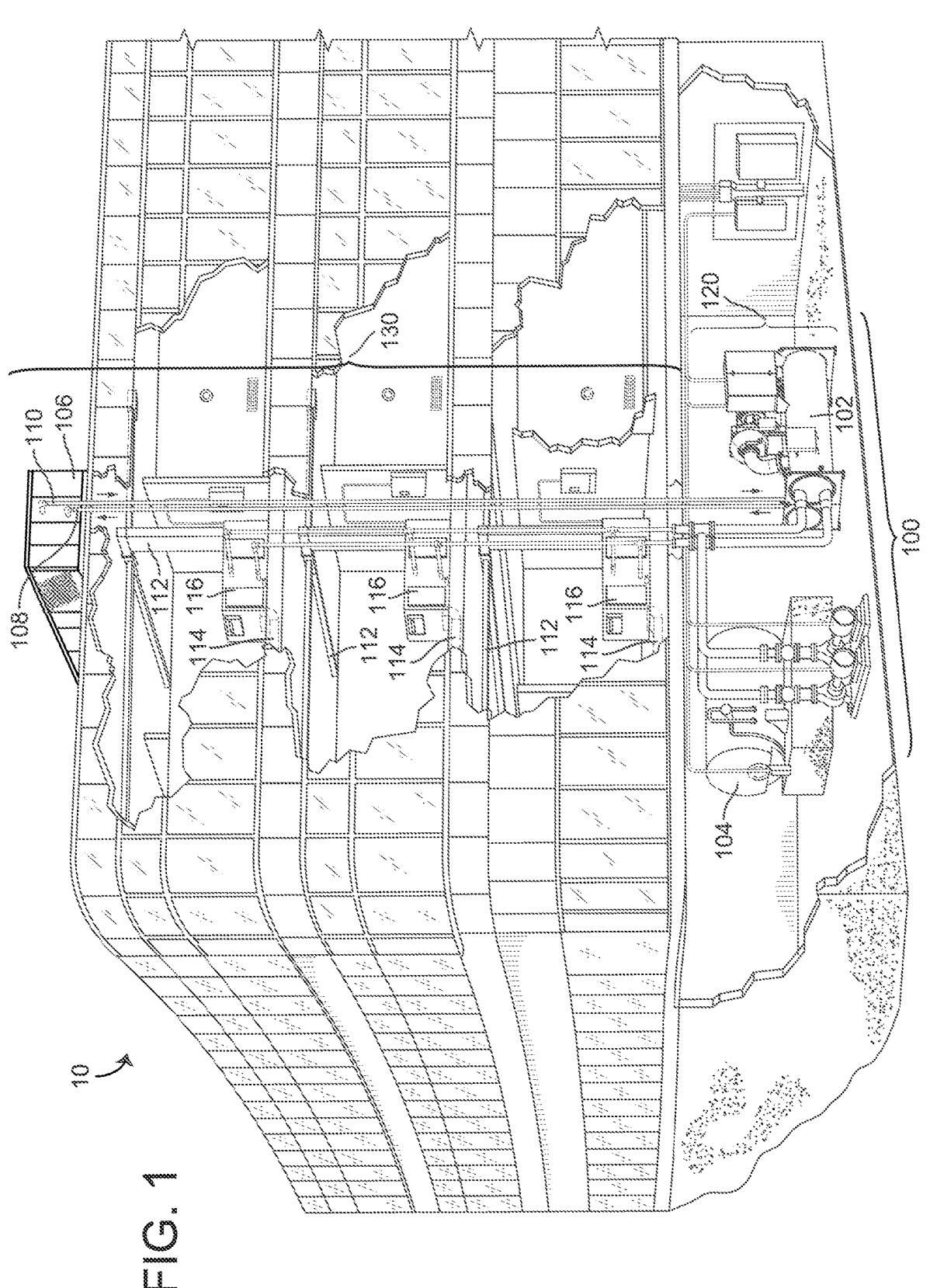
FIG. 1 is a drawing of a building equipped with a HVAC system, according to some embodiments.

While a BMS may create several opportunities for building managers to run buildings more efficiently and reduce building operation costs, it can be challenging to protect building networks from cybersecurity threats. For example, out of date BMS software and/or firmware can leave the system vulnerable to cybersecurity threats (e.g., viruses, hackers, etc.). Such out of date BMSs may not take advantage of the latest algorithms, components, etc., unless the BMS software and firmware is updated, which can be a time-consuming process.

Additionally, a BMS will have multiple different components with different objectives. For example, a BMS may include different system devices such as supervisory controllers, field controllers, servers, and connectivity or network devices. Each of these components may be used as an entry point into the larger network. For example, just single cybersecurity problem on one component of a BMS can put the whole building's security at risk.

There is currently no standard BMS cybersecurity protocol or standard encompassing each building component that building operators or managers can refer to in order to ensure good cybersecurity practices. Therefore it would be desirable to monitor the whole BMS for cybersecurity problems and report these cybersecurity issues to a user (e.g., a building manager) in an intuitive format, allowing the user to correct these cybersecurity problems quickly and easily in order to avoid cybersecurity threats.

Referring generally to the FIGURES, a system and methods for calculating a cybersecurity best practices score (CBPS) are shown, according to some embodiments. CBPS may be a value indicative of the overall level of cybersecurity of a BMS. A CBPS value can provide numerous insights to a user (e.g., a building manager, a facilities operator, etc.), allowing the user to quickly and easily monitor cybersecurity risks associated with the BMS. In particular, a CBPS tool may be configured to receive cybersecurity data from a variety of BMS components, calculate a cybersecurity score for each of the variety of BMS components, and calculate an aggregate CBPS for the BMS based on the various performance scores. Operating data can be obtained from computing devices (e.g., servers) of the BMS, BMS devices such as supervisory controllers and field controllers, and from BMS connectivity (i.e., network) devices (e.g., modems, modem pens, ports, etc.). The term "server" as utilized herein can include any type of computing device (e.g., application server, Internet/web server or cloud-based server, a computing device such as an edge computing device having software/firmware configured to cause the device to have server capabilities/functionality, etc.), and is not restricted to a particular architecture.

A number of different factors may impact the CBPS for a particular BMS. In some embodiments, a number of parameters for each component of the BMS may be established, and operating data for each BMS components may be compared to these parameters to calculate the cybersecurity scores for each component. For example, parameters such as server versions being up to date and firmware (e.g., supervisory firmware, field controller firmware, etc.) being up to date. Any firmware or software that does not meet these parameters (e.g., out of date software) may incur a penalty score that reduces the cybersecurity score for the corresponding software or firmware. Cybersecurity scores for all of the computing system devices (e.g., servers, software, and firmware), servers (e.g., application data server), and network devices in a BMS can be aggregated to generate the CBPS.

In some embodiments, the CBPS may be utilized to automatically generate recommendations for improving a BMS's cybersecurity. For example, it may be determined that an out of date server software does not have the necessary updates to patch a security risk therefore negatively impacting BMS cybersecurity. (e.g., lowering the CBPS), so a CBPS tool may recommend to a user that the server software be updated. In some embodiments, the CBPS may also be utilized to automatically schedule service or maintenance for various BMS components. For example, firmware updates may automatically be scheduled for outdated supervisory controller firmware and field controller firmware in order to prevent lowering the CBPS. Additionally, in some embodiments, the CBPS may be presented via various user interfaces, to allow a user to quickly and intuitively view BMS cybersecurity and identify cybersecurity risks.

Building with Building Systems

Referring now to FIGS. 1-4, an exemplary BMS and HVAC system in which the systems and methods of the present disclosure can be implemented are shown, according to some embodiments. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire safety system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Figure 2:
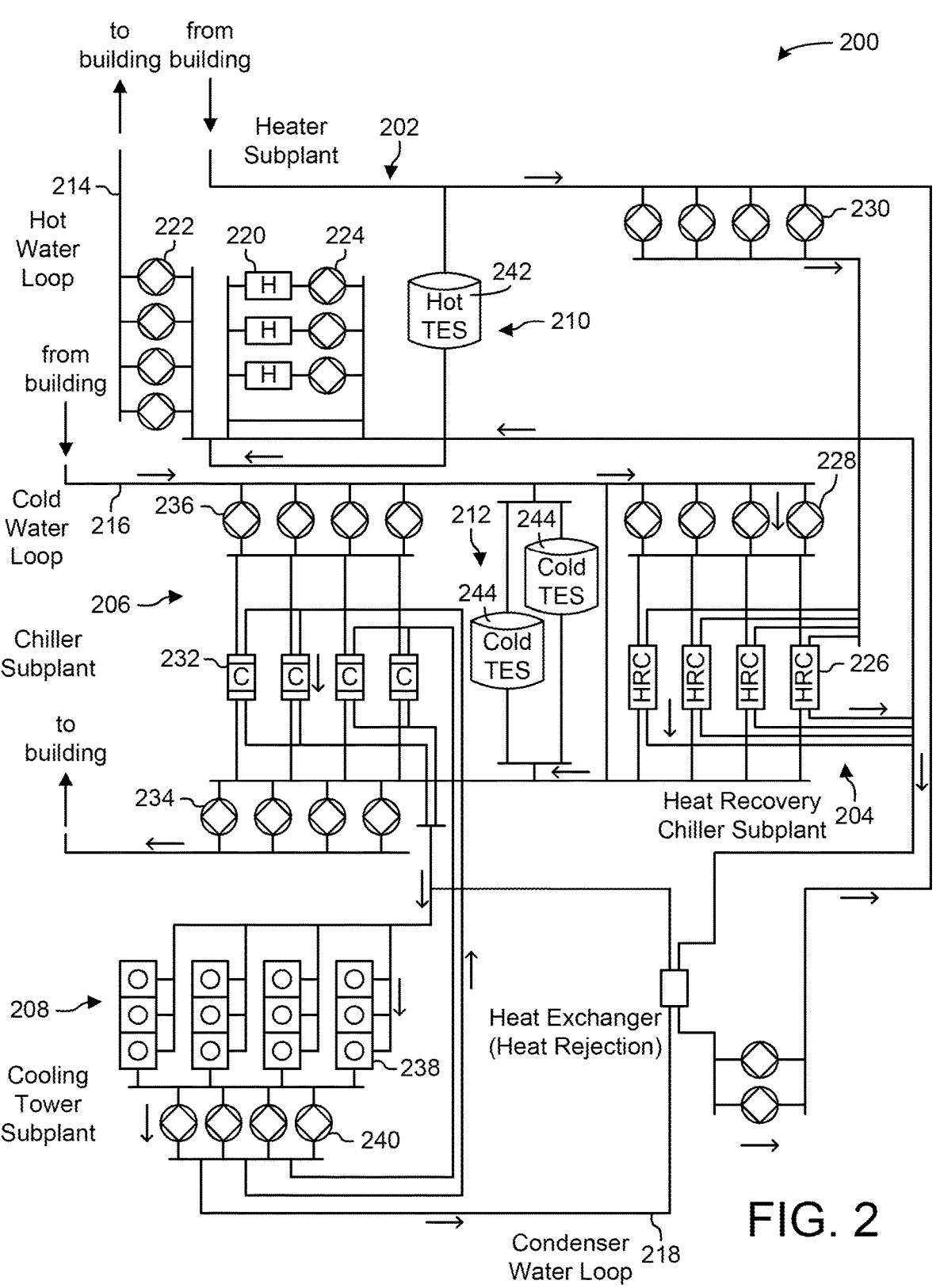
FIG. 2 is a block diagram of a waterside system that may be used in conjunction with the building of FIG. 1, according to some embodiments.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) may be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present invention.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves may be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
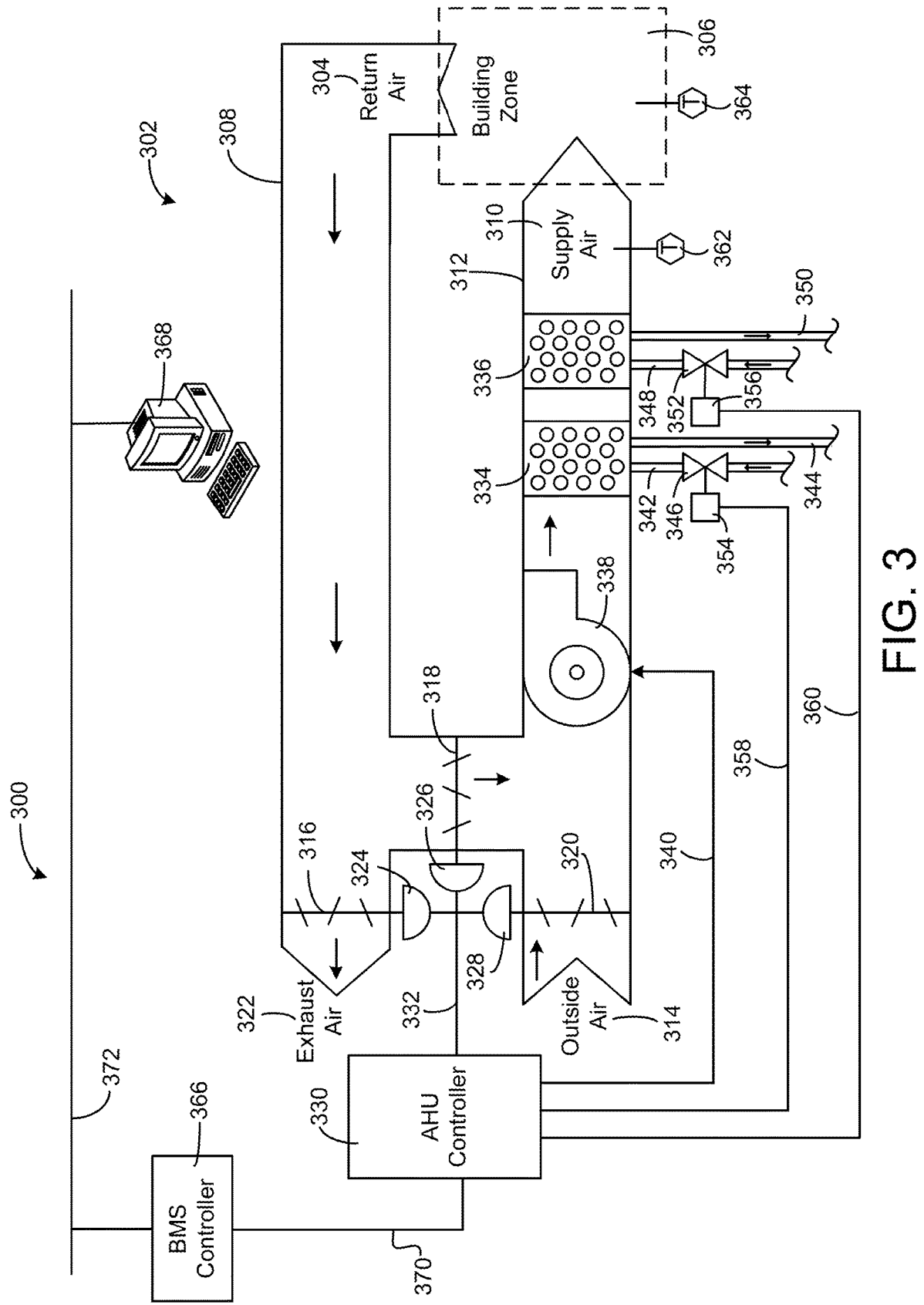
FIG. 3 is a block diagram of an airside system that may be used in conjunction with the building of FIG. 1, according to some embodiments.

Referring now to FIG. 3, a block diagram of an airside system 300 is shown, according to some embodiments. In various embodiments, airside system 300 may supplement or replace airside system 130 in HVAC system 100 or may be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and may be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 may be configured to operate exhaust air damper 316, mixing damper 318, and outside air damper 320 to control an amount of outside air 314 and return air 304 that combine to form supply air 310. Any return air 304 that does not pass through mixing damper 318 may be exhausted from AHU 302 through exhaust damper 316 as exhaust air 322.

Each of dampers 316-320 may be operated by an actuator. For example, exhaust air damper 316 may be operated by actuator 324, mixing damper 318 may be operated by actuator 326, and outside air damper 320 may be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that may be collected, stored, or used by actuators 324-328. AHU controller 330 may be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 may be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 may be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 may be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 may be controlled by an actuator. For example, valve 346 may be controlled by actuator 354 and valve 352 may be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 may control the temperature of supply air 310 and/or building zone 306 by activating or deactivating coils 334-336, adjusting a speed of fan 338, or a combination of both.

Still referring to FIG. 3, airside system 300 is shown to include a building automation system (BMS) controller 366 and a client device 368. BMS controller 366 may include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 may be separate (as shown in FIG. 3) or integrated. In an integrated implementation, AHU controller 330 may be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 may be a computer workstation, a client terminal, a remote or local interface, or any other type of user interface device. Client device 368 may be a stationary terminal or a mobile device. For example, client device 368 may be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Figure 4:
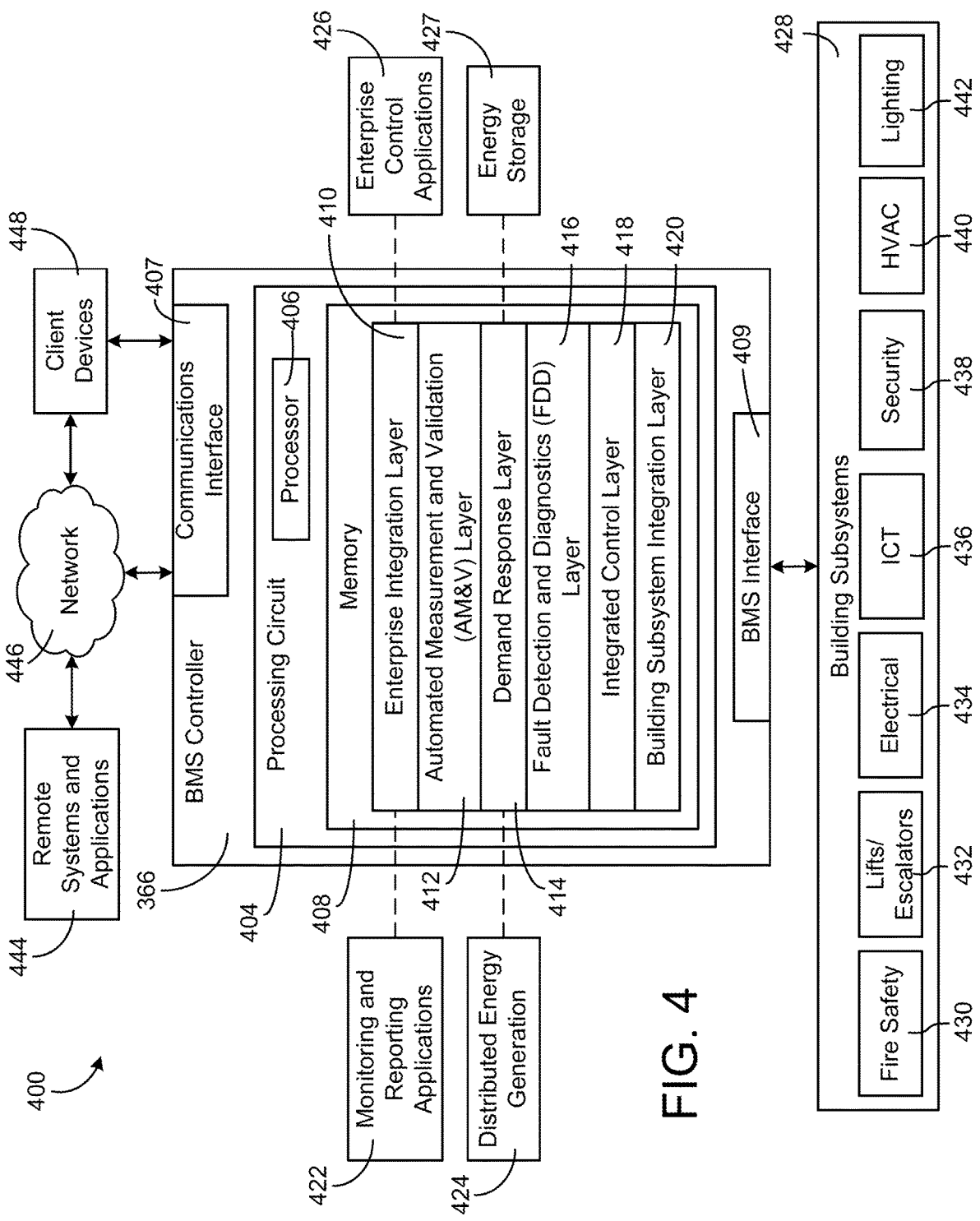
FIG. 4 is a block diagram of a building management system (BMS) that may be used to monitor and/or control the building of FIG. 1, according to some embodiments.

Referring now to FIG. 4, a block diagram of a building automation system (BMS) 400 is shown, according to some embodiments. BMS 400 may be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 may be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a WiFi transceiver for communicating via a wireless communications network. In another example, one or both of interfaces 407, 409 may include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 may be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 408 may be or include volatile memory or non-volatile memory. Memory 408 may include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 may be distributed across multiple servers or computers (e.g., that can exist in distributed locations). Further, while FIG. 4 shows applications 422 and 426 as existing outside of BMS controller 366, in some embodiments, applications 422 and 426 may be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 may be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 may be configured to serve clients or local applications with information and services to support a variety of enterprise-level applications. For example, enterprise control applications 426 may be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., cybersecurity, efficiency, energy use, comfort, or safety) based on inputs received at interface 407 and/or BMS interface 409.

Building subsystem integration layer 420 may be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 may be configured to optimize resource usage (e.g., electricity use, natural gas use, water use, etc.) and/or the monetary cost of such resource usage in response to satisfy the demand of building 10. The optimization may be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions may be edited or adjusted by a user (e.g., via a graphical user interface) so that the control actions initiated in response to demand inputs may be tailored for the user's application, desired comfort level, particular building equipment, or based on other concerns. For example, the demand response policy definitions can specify which equipment may be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 may be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated super-system. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 may be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 may be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 may be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 may be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 may be configured to provide calculated inputs (e.g., aggregations) to these higher levels based on outputs from more than one building subsystem.

Automated measurement and validation (AM&V) layer 412 may be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 may be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 may be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 416 may be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) may shut-down systems or direct control activities around faulty devices or systems to reduce energy waste, extend equipment life, or assure proper control response.

FDD layer 416 may be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 may include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Cybersecurity Best Practices Score (CBPS)

In some embodiments, a cybersecurity best practices score (CBPS) is calculated for a BMS (e.g., the BMS of building 10, described above). This CBPS may be a value indicative of the cybersecurity health of a BMS. The terms CBPS and cybersecurity score may be used interchangeably within the present disclosure. A CBPS value can provide numerous insights to a user (e.g., a building manager, a facilities operator, etc.), allowing the user to quickly and easily determine whether there are areas within the BMS that leave the BMS open to cybersecurity threats (i.e., cyberattacks). Advantageously, CBPS can be calculated for one or more BMSs managed by a single user, system, group, company, etc., providing an overview of the cybersecurity strength of a BMS across multiple sites, buildings, facilities, etc. Additionally, a CBPS for a first site can be compared to other sites having similar parameters (e.g., location, size, building type, etc.) to provide insights regarding the first site's cybersecurity compared to other sites.

The CBPS summarizes data collected over the whole BMS into a concise score that clearly outlines potential cybersecurity problems. The CBPS summarizes the cybersecurity status of a BMS by focusing on three main BMS components: a BMS device security status, an application data server (ADS) server security status, and a connectivity security status. The BMS device security status describes the cybersecurity associated with various BMS devices such as supervisory and field controllers. For example, the CBPS may include, in part, information about whether a BMS server version, a supervisory controller firmware, and/or, a field controller firmware is up to date.

The ADS server security status describes the security status of the ADS. For example, the CBPS may also include information about whether operating systems associated with the BMS are up to date. For example, a user may install a BMS on a Windows machine that runs a Windows operating system (e.g., a PC or tablet). Now that Windows machine may act as a gate that a hacker can use to carry out a cyberattack on the user's BMS if the Windows operating system is not running the latest version. The CBPS may also include information about a firewall status of the BMS. A network firewall may prevent malware from spreading from one or more devices or servers within a network to the whole network (e.g., the BMS). It is not uncommon for building operators to disable firewalls within a BMS leaving the BMS open to cybersecurity risk. The CBPS shows the user which firewalls within the BMS are disabled so that building operators may enable the firewalls thereby mitigating the cybersecurity risk. The CBPS may also include information about the antivirus status of the BMS. Antivirus software/ hardware prevents devices, servers, and networks from being infected with viruses or malware by detecting and removing viruses. The CBPS shows the user whether antivirus has been implemented within the BMS and if it is up to date.

The CBPS may also include information about port (e.g., USB, HDMI, VGA, charging, etc.) status. One common way of infecting a device or system with malware is through inserting a corrupted USB into the system through a USB port. Building operators can avoid this by disabling USB ports associated with the BMS during general building operation and only enabling the USB ports during specific brief periods as necessary. The CBPS shows the user if the USB port is enabled or disabled and the duration of how long the USB port being enabled. The CBPS may also include information about whether a new application has been installed. Though not every new application installed is carrying malware, every time a new application is installed, the risk for malware affecting the BMS increases temporarily. The CBPS may also include information about whether cybersecurity policies are in place. For example, a BMS may include user password policy (e.g., password strength, password updating every 60 to 90 days, etc.) and an auto log off policy (e.g., automatically locking a BMS device after a certain period of inactivity, etc.).

Lastly, the connectivity security status describes the cybersecurity status of the network devices associated with the BMS. In some embodiments, the BMS may be implemented on a user's (e.g., a customer) own network at their building site. In other embodiments, the BMS may be implemented on a different network than the user's network through common network devices (e.g., routers, modems, etc.). Ensuring the cybersecurity of the network devices is integral to the cybersecurity of the entire BMS. Therefore, the cybersecurity status of the network devices may also be included within the CBPS. The CBPS may include information about modem security status (e.g., modem firewall status, modem pen testing, modem firmware status, modem port blocking, etc.). The CBPS may include information about the network data upload/download pattern. For example, if data uploads or downloads deviate 20% more than usual, this may indicate a cybersecurity risk. Lastly, the CBPS may include information about a user security status for the connectivity device (e.g., attempted unauthorized user access, implementing a password change policy, etc.).

Accordingly, via the process of calculating a CBPS for a BMS, these BMS cybersecurity threats or issues can be identified, allowing the user to address and correct the cybersecurity issues in order to improve a BMS's cybersecurity safety. For example, a user may not be aware that their software or firmware version is out of date and leaves them open to cybersecurity risk which may be revealed by the CBPS calculation, allowing the user to update the software or firmware version.

Figure 5:
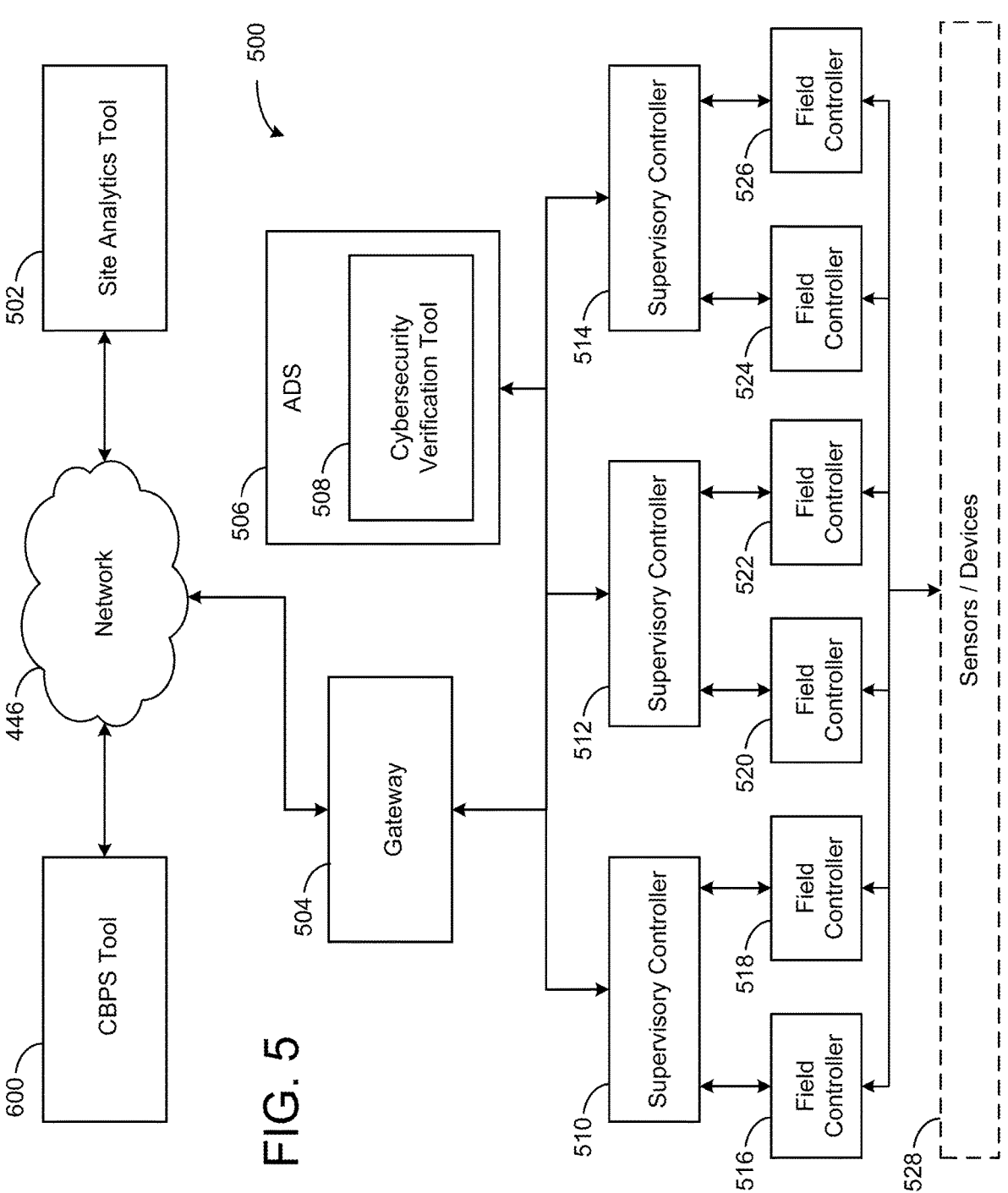
FIG. 5 is a block diagram of a system for monitoring various components of a BMS and calculating a BMS CBPS, according to some embodiments.

Referring now to FIG. 5, a block diagram of a system 500 for monitoring various components of a BMS and calculating a CBPS value is shown, according to some embodiments. System 500 is shown to include a CBPS tool 600, a site analytics tool 502, and a gateway 504, all communicably coupled to network 446. While shown as singular components each of CBPS tool 600, site analytics tool 502, and gateway 504 may also be implemented across multiple devices (e.g., via a distributed computing architecture).

CBPS tool 600, site analytics tool 502, and gateway 504 generally include a processor and memory for storing and executing instructions. Said memory may include one or more devices (e.g., RAM, ROM, Flash memory, hard disk storage, etc.) for storing data and/or computer code for completing or facilitating the various processes, layers and modules described in the present application. The memory may be or include volatile memory or non-volatile memory and may include database components, object code components, script components, or any other type of information structure for supporting the various activities and information structures described in the present application.

At a high level, CBPS tool 600, site analytics tool 502, and gateway 504 may transmit and receive (i.e., communicate) data, including various operating data and/or parameters, via network 446. For example, CBPS tool 600 may receive data from site analytics tool 502 and gateway 504, and/or may transmit data to site analytics tool 502 and gateway 504. Network 446 may be any type of communications network, as described above, such as a WAN, LAN, the Internet, a cellular network, etc. Accordingly, each of CBPS tool 600, site analytics tool 502, and gateway 504 may include a network interface for wired and/or wireless communications. For example, CBPS tool 600 may include a wireless network interface (e.g., a WiFi transmitter/receiver) and site analytics tool may include an Ethernet interface. It will be appreciated that any combination of wired and/or wireless communications may be utilized.

As shown, gateway 504 can be configured to receive cybersecurity data from a plurality of supervisory controllers 510-514. In particular, in some embodiments, gateway 504 may receive and/or collect operating data via an open communications protocol, such as BACnet, from any of supervisory controllers 510-514. Supervisory controllers 510-514 may be any high-level controller of a BMS capable of supervising other controllers. In one example, each of building subsystems 426, described above, may include a supervisory controller. In some embodiments, each of supervisory controllers 510-514 can include a processor and memory for performing one or more functions, such as receiving, processing, and/or transmitting data, and/or providing control signals to various lower-level field controllers 516-526. Additionally, it will be appreciated that system 500 may include any number of supervisory controllers.

Field controllers 516-526 can include any controllers in a BMS that are at a lower level (e.g., hierarchically) than supervisory controllers 510-514. For example, each of field controllers 516-526 may be a controller for a particular device or space in a building. Supervisory controllers 510-514 may receive cybersecurity data from field controllers 516-526 relating to cybersecurity data relating to various BMS components, devices, and/or sensors 528. Sensors/device 528 can include any sensors or field devices (i.e., edge devices) included in a BMS, such as any of the sensors or equipment described above with respect to FIGS. 1-4. As an example, sensors/devices 528 can include sensors for measuring various equipment or space parameters (e.g., temperature, pressure, speed, etc.) and devices such as chillers, AHUs, valves, lights, fans, etc.

In some embodiments, field controllers 516-526 collect cybersecurity data from sensors/devices 528 during BMS operations, and also provide control signals to sensors/ devices 528 based on the cybersecurity data, and/or based on other inputs. For example, a field controller may collect information about a server associated with a BMS such as data upload and download rates. Supervisory controllers 510-514 can subsequently collect said cybersecurity data, and other information such a field controller parameters or settings, from one or more of field controllers 516-526. It will be appreciated that, as described herein, operating data may be collected and/or transmitted on demand, at regular intervals, instantly, or at any other appropriate interval.

To continue the previous example, a field controller (e.g., field controller 516) for a server can collect various cybersecurity data in real-time, as the building operates. This cybersecurity data may then be collected, in real-time or at a regular interval (e.g., every five minutes, every hour, etc.), by a corresponding supervisory controller (e.g., supervisory controller 510, which may be a supervisory controller for an security subsystem such as security subsystem 438). A portion of the cybersecurity data may be formatted in accordance with an open communications protocol (e.g., BACnet), as discussed above, and accordingly may be collected and transmitted (e.g., to CBPS tool 600 and/or site analytics tools 502) by gateway 504.

In some embodiments, a portion of the cybersecurity data collected by supervisory controllers 510-514 may be in a proprietary format that cannot be received, processed, and/or transmitted by gateway 504. In other words, certain operating data may be collected from proprietary equipment or sensors (e.g., sensors/devices 528) in a format other that an open communication protocol. Additionally, information such as parameters and/or settings (e.g., policies, schedules, etc.) of field controllers 516-526 and/or supervisory controllers 510-514 may not be accessible or receivable by gateway 504. In this case, an application data server (ADS) 506 may collect a portion of the cybersecurity data for further analysis and/or processing, before being transmitted to CBPS tool 600 and/or site analytics tool 502.

ADS 506 may be a computing device such as a server or computer that manages the collection of large amounts of operating data from the various components of a BMS. In this case, ADS 506 is configured to collect operating data and other information from supervisory controllers 510-514. In particular, ADS 506 can collect data in both an open communication protocol, and any other formats (e.g., a proprietary format). Accordingly, ADS 506 can process and/or reformat the data that cannot be handled by gateway 504. ADS 506 may also or host a cybersecurity verification tool (CVT) 508, which processes and/or reformats the collected cybersecurity data. In particular, CVT 508 can obtain and analyze the cybersecurity data, and can generate a report or can convert the cybersecurity data for transmission to CBPS tool 600 and/or site analytics tool 502 by gateway 504. In some embodiments, CVT 508 is an application or a program that is stored on memory of ADS 506 and executed by a processor of ADS 506.

In some embodiments, CVT 508 is continuously executed, thereby processing the cybersecurity data in real-time. In other embodiments, CVT 508 is executed at a regular interval (e.g., every day) to batch process the cybersecurity data. In such embodiments, ADS 506 may collect the operating data between executions of the CVT 508, and CVT 508 may generate a report based on the collected data. This report and/or the processed operating data may be transmitted via gateway 504 to CBPS tool 600 and/or site analytics tool 502.

Site analytics tool 502 is generally configured to receive raw or preprocessed cybersecurity data from gateway 504

(e.g., via an application programming interface (API), in some cases), and can perform various additional functions using the data. In particular, site analytics tool 502 may be configured to aggregate portions of the cybersecurity data, and may also identify faults, warnings, or alarms. For example, site analytics tool 502 may analyze cybersecurity data to determine a cybersecurity risk with a particular building device (e.g., of sensors/devices 528), and may provide an alarm or notification based on the cybersecurity risk. In some embodiments, site analytics tool 502 may also generate user interfaces for presenting aggregate cybersecurity data in the form of graphs, charts, etc., and for presenting fault or alarm information. In some such embodiments, site analytics tool 502 may implement various FDD rules (e.g., similar to FDD layer 416 of BMS controller 366), and/or may interface with BMS controller 366 to identify faults.

While the example embodiment illustrated in FIG. 5 is a multi-tiered BMS architecture (e.g., including three tiers with one or more servers and supervisory controllers, field controllers, and edge sensors/devices), it should be understood that the present methodology could apply to a BMS with any type of architecture. For example, in some implementations, the BMS may have a two-tiered architecture in which one layer of controllers communicates directly between edge sensors/devices and a server via a gateway. In some implementations, the BMS or a portion thereof may have a single-tiered architecture in which the edge sensors/devices themselves may be capable of communicating directly with the gateway and other devices (e.g., servers, cloud-based or other off-premises systems, etc.) to perform functions of the BMS. All such modifications are contemplated within the scope of the present disclosure.

Figure 6:
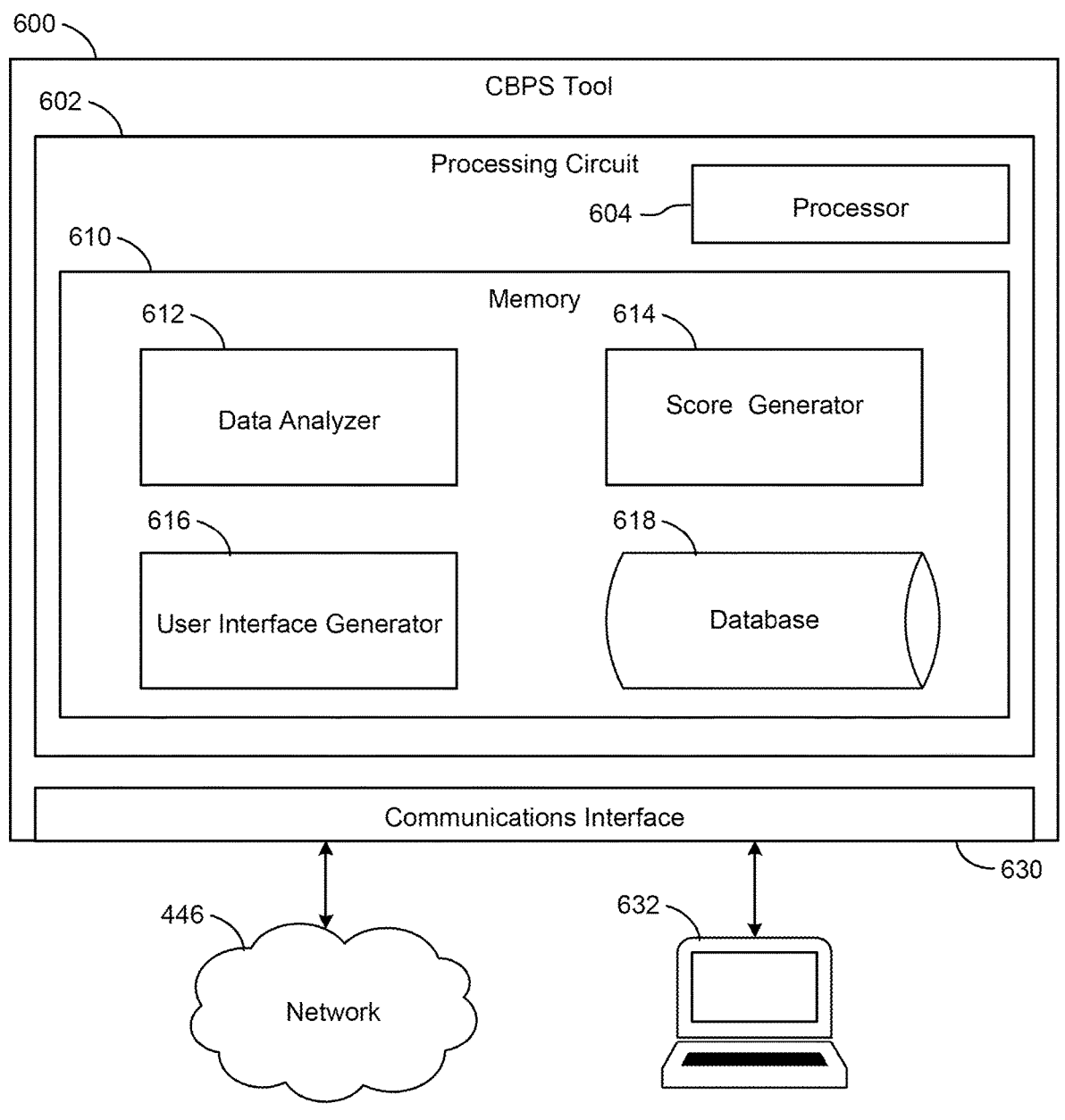
FIG. 6 is a block diagram of a CBPS tool implemented in the system of FIG. 5, according to some embodiments.

Referring now to FIG. 6, a detailed block diagram of CBPS tool 600 is shown, according to some embodiments. As briefly described above, CBPS tool 600 may receive data from site analytics tool and/or gateway 504, and may calculate a CBPS based on the received data. In particular, CBPS tool 600 may receive cybersecurity data or parameters relating to ADS 506, supervisory controllers 510-514, field controllers 516-526, and/or sensors/devices 528, and may generate a cybersecurity score for each components of system 500. Cybersecurity scores for each of the components of system 500 may be aggregated to calculate a CBPS. Based on the CBPS, which can be calculated once (e.g., on demand) or periodically, or even continuously, various control actions can be initiated, recommendations can be made, and/or interventions can be initiated.

CBPS tool 600 is shown to include a processing circuit 602, which includes a processor 604 and a memory 610. It will be appreciated that these components can be implemented using a variety of different types and quantities of processors and memory. For example, processor 604 can be a general purpose processor, an application specific integrated circuit (ASIC), one or more field programmable gate arrays (FPGAs), a group of processing components, or other suitable electronic processing components. Processor 604 can be communicatively coupled to memory 610. While processing circuit 602 is shown as including one processor 604 and one memory 610, it should be understood that, as discussed herein, a processing circuit and/or memory may be implemented using multiple processors and/or memories in various embodiments. All such implementations are contemplated within the scope of the present disclosure.

Memory 610 can include one or more devices (e.g., memory units, memory devices, storage devices, etc.) for storing data and/or computer code for completing and/or facilitating the various processes described in the present disclosure. Memory 610 can include random access memory (RAM), read-only memory (ROM), hard drive storage, temporary storage, non-volatile memory, flash memory, optical memory, or any other suitable memory for storing software objects and/or computer instructions. Memory 610 can include database components, object code components, script components, or any other type of information structure for supporting the various activities and information structures described in the present disclosure. Memory 610 can be communicably connected to processor 604 via processing circuit 602 and can include computer code for executing (e.g., by processor 604) one or more processes described herein.

Memory 610 is shown to include a data analyzer 612, configured to processes a wide variety of cybersecurity data from site analytics tools 502 and/or gateway 504. In particular, CBPS tool 600 may receive cybersecurity data from site analytics tools 502 and/or gateway 504, and data analyzer may interpret, format, store, and/or retrieve the cybersecurity data. In some embodiments, data analyzer 612 requests (i.e., queries) particular cybersecurity data needed for calculating a CBPS, as discussed in greater detail below. In such embodiments, data analyzer 612 may transmit queries to any of site analytics tools 502, gateway 504, or ADS 506 (e.g., through gateway 504), and may subsequently receive requested information. In some embodiments, data analyzer 612 receives raw operating data from gateway 504 and receives preprocessed data from site analytics tool 502. In particular, site analytics tool 502 may transmit fault and alarm data to data analyzer 612.

Memory 610 is also shown to include a score generator 614, configured to generate a CBPS value based on cybersecurity data. Score generator 614 may receive any operating data necessary for calculating the CBPS from data analyzer 612, and may calculate the CBPS on demand, or at regular intervals. In some embodiments, score generator 614 calculates a cybersecurity score for each component or for various subsets of the components of system 500 as described above. In particular, score generator 614 may generate individual cybersecurity scores for ADS 506, supervisory controllers 510-514, field controllers 516-526, and sensors/devices 528 (including connectivity devices such as routers and modems). Score generator 614 may aggregate the various individual cybersecurity scores to generate the CBPS.

In some embodiments, CBPS tool 600 receives cybersecurity data in real-time, or in near real-time. Accordingly, a CBPS may be calculated continuously, or at regular intervals. In some embodiments, CBPS tool 600 may analyze previously collected (i.e., historic) BMS data to calculate a CBPS at a previous time period. Accordingly, CBPS can be compared over time, to determine if certain systems changes or upgrades (e.g., new devices, new software updates, new firmware updates, etc.) are beneficial to system health and efficiency.

In some embodiments, score generator 614 may analyze the cybersecurity data according to a plurality of rules. Each rule may define a calculation or model for determining a penalty score for a particular parameter of an associated BMS component, and penalty scores for each rule may be applied to the cybersecurity score for each component. When analyzing a supervisory controller or multiple controllers, for example, score generator 614 may utilize a variety of predefined parameters (e.g., firmware version, etc.) that affect the cybersecurity of the supervisory controller(s). If it is determined that a particular controller or controllers do not meet a parameter (e.g., firmware version out of date), then score generator 614 will apply a penalty to the cybersecurity score for the controller(s).

The calculations performed by score generator 614 are described in greater detail with respect to FIG. 7, which shows an example graph 700 for calculating the CBPS of a BMS, according to some embodiments. Based on the calculations shown in graph 700, score generator 614 may calculate individual cybersecurity scores for a BMS server and one or more ADSs, supervisory controllers, field controllers, connectivity devices, points, and various other equipment of a BMS. In this example, the BMS includes, one BMS server, one ADS (e.g., ADS 506), ten supervisory controllers (e.g., supervisory controllers 510-514), and 40 field controllers (e.g., field controllers 516-526). For each parameter or rule, graph 700 includes a brief description, a total count of components (e.g., devices, sensors, points, etc.), a total deviation count (e.g., the number of components that do not meet the rule), an ideal score, and a penalty score.

As shown, score generator 614 may obtain (e.g., automatically or by request) a variety of cybersecurity data for each component, based on the various parameters or rules that are analyzed to generate the cybersecurity score for each component. To analyze ADS servers, for example, score generator 614 may determine a version of the ADS firmware or software, the ADS firewall status, the ADS antivirus status, the ADS USB port status, and cybersecurity policies associated with the ADS. As discussed above, this cybersecurity data may be received by CBPS tool 600 from ADS 506 (e.g., via gateway 504). For example, ADS 506 may regularly transmit this cybersecurity data to CBPS tool 600, or CBPS tool 600 may request or determine this information as needed. In some embodiments, CBPS tool 600 may interface with an API or an application hosted by ADS 506 that collects this information.

Continuing the example shown in FIG. 7, the single ADS for this BMS (e.g., the BMS of building 10) is determined to meet the parameters of the server operating system (OS) being up to date, the server OS auto update being enabled, the ADS firewall being enabled, the ADS antivirus being installed and auto updated being enabled, the USB ports being disabled, ensuring only trusted new applications are installed, and implementing cybersecurity policies (e.g., password policy and auto log off policy in place). In this particular example, the server OS is up to date so the "total deviation count", which describes how many system components do not meet a particular parameter or requirement, is "0". The "ideal score", which describes the perfect cybersecurity score for meeting a particular parameter or requirement, is "3". The "penalty score", which describes what penalty (e.g., number subtracted from the ideal score) will be assessed for not meeting a particular component or requirement, is "0" in this case because the ADS meets this particular parameter (e.g., the server OS is up to date). Subtracting the penalty score (0) from the ideal score (3) leaves us with a cybersecurity score of 3 for this particular parameter of the ADS.

Different rules are assigned for assessing penalty scores for each parameter when calculating cybersecurity scores. For example, in the case of the "server OS up to date" parameter, the penalty score equals the ideal score if the ADS server OS is not up to date (i.e., older than the current version available). As another example, in the case of the "firewall enable/disable status" parameter, the penalty score increases by a 0.1 increment for every 5 seconds that the firewall is disabled. As a final example from graph 700, based on cybersecurity data received from gateway 504 and/or site analytics tools 502, CBPS tool 600 has determined that the firmware for the 7 field controllers is outdated. A penalty score is calculated for the number of controllers with outdated firmware, where the penalty score is equal to:

$$S_{penalty} = \left(\frac{S_{ideal}}{n}\right) \times z$$

where $S_{penalty}$ is the penalty score, $S_{ideal}$ is the predetermined ideal score, n is the total number of field controllers, and z is the number of controllers with outdated firmware, respectively. Here, a cybersecurity score of 3.3 is calculated for the "field controller firmware up to date" parameter.

Adding each of the individual cybersecurity scores within each of the three main components of the BMS (e.g., BMS device security status, ADS server security status, and the connectivity security status) gives an "overall score" that describes the cybersecurity of that component. Going back to the example in FIG. 7, the BMS device security status area has overall score of 9.3 out of a possible 20. The ADS server security status area has an overall score of 27 out of a possible 40. The connectivity security status area has an overall score of 38 out of a possible 40.

After calculating an overall score for each component of the BMS, score generator 614 may aggregate the overall scores to determine the CBPS of the BMS. In this example, the CBPS is calculated at 74.30, out of a total possible CBPS of 100 (e.g., where a CBPS of 100 would be indicate that the BMS is following all the cybersecurity best practices). In some embodiments, score generator 614 may also identify (e.g., flag) parameters or rules that the BMS did not meet. In other words, performance index generator 614 may indicate areas where the BMS was issued a penalty score. For example, in response to determining that seven field controllers are not updated with the latest firmware version (e.g., as shown in graph 700), score generator 614 may identify the outdated controllers for additional analysis or manual inspection by a user. The process of calculating a CBPS for a BMS is described below in greater detail, with respect to FIG. 8.

Referring again to FIG. 6, memory 610 further includes a user interface (UI) generator 616. UI generator 616 may be configured to generate graphical interfaces for presenting CBPS related information. For example, UI generator 616 may generate interfaces that present graphs, charts, animations, etc. that indicate a CBPS value for a BMS. In some embodiments, UI generator 616 may also generate and present interfaces that indicate BMS cybersecurity risks. For example, an interface may be generated that indicates specific BMS components (e.g., controllers, devices, etc.) that caused a non-zero penalty score during the calculation of the CBPS.

The various user interfaces generated by UI generator 616 may be presented via a user device 632. User device 632 may be any device having an interface for presenting data to a user. For example, user device 632 may include at least a screen for presenting interfaces, and an input device for receiving user inputs. In some embodiments, user device 632 is a desktop or laptop computer, a smartphone, a tablet, a smart watch, etc. User device 632 may be communicably coupled to CBPS tool 600 via a communications interface 630, which also provides an interface for CBPS tool 600 to transmit and receive data via network 446.

Memory 610 also includes a database 618, which can be configured to store, maintain, and/or retrieve any type of information that is relevant to the calculation of a CBPS. For example, database 618 may store cybersecurity data received from any of the components of system 500, and/or may store previous CBPS calculations. In this regard, the CBPS for a particular BMS may be analyzed (e.g., via a user interface) over time, to identify trends that indicate increased or decreased system health and efficiency. For example, a CBPS that steadily rises over time may indicate that various operating processes are improving cybersecurity.

Referring now to FIG. 8, a process 800 for calculating a CBPS value for a BMS is shown, according to some embodiments. Process 800 may be implemented by system 500, for example, and at least in part by CBPS tool 600. As described above, CBPS may be calculated for one or more facilities (i.e., sites, buildings, etc.), and may provide an intuitive indication of the cybersecurity status of the BMS associated with those facilities. In particular, the CBPS can be a numerical value that indicates BMS performance. Advantageously, process 800 may allow users (e.g., building managers) to quickly identify BMS cybersecurity risks, leading to improved BMS operations. It will be appreciated that certain steps of process 800 may be optional and, in some embodiments, process 800 may be implemented using less than all of the steps.

At step 805, first data indicating a security characteristic of software or firmware for one or more BMS devices is obtained. Specifically, the first data may include cybersecurity data for one or more servers, supervisory controllers and/or one or more field controllers of the BMS. In some embodiments, the first data may be collected in part by the servers (e.g., via a program such as the cybersecurity verification tool 508), and may also be collected in part by gateway 504. For example, cybersecurity data in a first, open format (e.g., BACnet) may be collected by gateway 504, while data in a second, proprietary format may be collected by cybersecurity verification tool 508. In some embodiments, the second data includes at least an indication of a firmware version for each controller and/or server.

At step 810, a first cybersecurity score is calculated based on the first cybersecurity data. The first cybersecurity score may indicate the cybersecurity status of the one or more BMS devices. In system 500, for example, the first cybersecurity score may indicate a cybersecurity status of supervisory controllers 510-514 and/or field controllers 516-526. The first cybersecurity score may be calculated by first determining a one or more rules or parameters for the BMS devices. These rules may be defined in a CBPS model (e.g., score generator 614) as described in FIG. 7, for example. The various rules shown in FIG. 7 are provided for example only, and are not limiting on the present disclosure. For example, in some implementations, the rules applied may be determined in part based on the architecture of the BMS system. In some implementations, the rules shown in the BMS Device Security Status portion of FIG. 7 may be used for a three-tier BMS, but different rules may be used for a two-tier BMS (e.g., excluding the supervisory firmware or field controller firmware component scores).

At step 815, second data indicating security characteristics for one or more servers (e.g., computing devices, computers) of a BMS is obtained. In some embodiments, the one or more servers include at least a main computing device for a BMS, such as a BMS controller or a device that executes BMS software. In other words, the one or more servers can include any high-level computing devices of a BMS. In system 500, for example, the second data includes cybersecurity parameters of ADS 506. More specifically, the second data includes cybersecurity parameters associated with one or more rules of a CBPS model (e.g., graph 700). In some embodiments, the first data includes at least an indication of a software or firmware version, a software auto update status, a firewall stats, an antivirus status, a USB port status, whether a new application has been installed on the server recently, and cybersecurity policies for each of the one or more high-level computing devices.

At step 820, a second cybersecurity score is calculated based on the second cybersecurity data. The first cybersecurity score may indicate the cybersecurity level of the one or more servers. In system 500, for example, the second cybersecurity score may indicate a cybersecurity level of ADS 506. The first cybersecurity score may be calculated by first determining a one or more rules or parameters for the servers. These rules may be defined in a CBPS model (e.g., FIG. 7), for example.

As discussed above with respect to FIG. 7, the parameters for servers can include a software version requirement, a requirement to auto update software (e.g. operating system, antivirus, etc.), a requirement to have firewall and antivirus enabled, a strong recommendation that the USB port is disabled, and cybersecurity policies requirement. The second data obtained at step 815 may be utilized to determine whether the servers fail to meet one or more parameters. Any parameters that the servers fail to meet may have a penalty score applied as explained above.

Penalty scores may be subtracted from an ideal score for each parameter. Using graph 700 as an example, an ADS server with an out of date software version may have a penalty score equal to the ideal score applied. Subtracting the penalty score from the ideal score would result in a 0 actual score for that parameter. The actual scores from each parameter associated with the servers may then be aggregated to determine an actual overall score (i.e., a first performance score) for the components (e.g., the servers).

In some embodiments, the parameters for supervisory controllers may also include a maximum average memory usage, an operating temperature range, and a desired battery level. In some such embodiments, battery level may simply be determined by an indication that the battery is low (e.g., below a threshold capacity). The second operating data obtained at step 806 may be utilized to determine whether one or more controllers fail to meet any of the one or more parameters. As discussed above with respect to the servers, a penalty score may be applied for any controllers that do not meet a parameter. Penalty scores may be determined by a formula unique to each parameter or rule. For example, the penalty score for out of date software or firmware may be determined by:

$$S_{penalty} = \left(\frac{S_{ideal}}{n}\right) \times z$$

where $S_{penalty}$ is the penalty score, $S_{ideal}$ is the predetermined ideal score, n is the total number of supervisory controllers, and z is the number of controllers with an out of date firmware. Additional penalty score calculations are shown in graph 700, described above.

In any case, the penalty score for each parameter may be subtracted from the ideal score for each parameter to determine an actual parameter score. For example, a BMS with three offline field controllers, out of ten total field controllers, may have a penalty score of 4.5. If an ideal score for the network status parameter of the field controllers is 15, then the actual score for that parameter will be 10.5. The actual scores for each parameter may then be aggregated to determine an actual overall score for the component(s) (i.e., a second performance score). In graph 700, for example, the actual overall score for field controllers was 15.5 out of a maximum possible score of 20.

At step 825, third data indicating network security characteristics for one or more connectivity or network devices (e.g., modems, routers, etc.) of a BMS is obtained. In particular, the third cybersecurity data may include cybersecurity data for one or more networking devices within the BMS. In some embodiments, the third cybersecurity data includes an indication of which BMS devices are behind customer hardware firewall. In some embodiments, the third cybersecurity data may include information about a modem's cybersecurity parameters (e.g., modem firewall status, port blocking status, modem pen testing status, and data upload and download patterns). In some embodiments, the third cybersecurity data may include information about unauthorized user login alert. In some embodiments, the third cybersecurity data may include information about remote user management (e.g., do remote user devices have out of date software or firmware?).

At step 830, a third cybersecurity score is calculated based on the third operating data. The third performance score may indicate the cybersecurity level of the network devices (e.g., modems, routers, etc.) associated with a BMS. In system 500, for example, the third cybersecurity score may indicate a cybersecurity level of connectivity or network devices 528. As described above with respect to steps 810 and 820, the third performance score may be calculated by first determining a one or more rules or parameters for the network devices. It should be understood that steps 825 and 830 are optional steps and, in some embodiments, a cybersecurity best practices score for the BMS may be generated using only the first and second scores. For example, in some implementations, the BMS may be a fully or primarily on-premises system (e.g., that may not be configured to connect with or receive commands from an off-premises system via the network) and the network security characteristics may not be evaluated and considered as part of the overall cybersecurity best practices score.

At step 835, the first, second, and, optionally, third cybersecurity scores are aggregated to generate a cybersecurity best practices score (e.g., CBPS) for the BMS. More specifically, the overall actual scores for each component type or category may be aggregated to determine the CBPS for the BMS. In some embodiments, the CBPS may include an aggregate of the cybersecurity scores for BMS devices (e.g., supervisory controllers, field controllers, etc.), ADS servers, and network devices associated with the BMS. In graph 700, for example, the actual overall scores for each category are added to determine a CBPS of 74.30, out of a maximum possible CBPS of 100. In some embodiments, CBPS may also be represented as a percentage (e.g., 74.3%) of a maximum value, where the closer the CBPS is to a maximum (e.g., 100%), the greater the cybersecurity level of the BMS.

At step 840, various actions are initiated based on the CBPS. In some embodiments, these actions include generating recommendations for improving the CBPS, and thereby lowering cybersecurity risks to the BMS. A recommendation may include, for example, an indication of one or more parameters or BMS components (e.g., controllers, modems, routers, servers etc.) that are negatively impacting the CBPS (e.g., parameters with a high penalty score), and may also include an indication of how the CBPS may be raised. For example, a high penalty score due to a field controller with outdated firmware may be lowered (e.g., thereby improving the CBPS) by ensuring the field controllers have the latest firmware installed (e.g., by manually or automatically updating the controller firmware and/or software). In this example, a prompt may be provided to a user to manually update the firmware version.

In some embodiments, maintenance or service may be automatically scheduled based on the CBPS. In other words, any components that are negatively impacting the CBPS may be identified, and some maintenance or service action may be scheduled to correct issues. For example, if a modem firmware is outdated which is lowering the CBPS (e.g., by incurring a penalty score), maintenance may be scheduled to update the modem firmware. In some embodiments, maintenance is scheduled by transmitting a request (e.g., from CBPS tool 600) to a remote maintenance management system.

In some embodiment, one or more building devices may be controlled based on the CBPS (e.g., to improve the CBPS). For example, if a software version for an upper-level computing device (e.g., the ADS 506) is out of date and causing a lower-than-ideal CBPS, a remote system may be automatically queried for a new software file, and the updated software file may be automatically installed. In some embodiments, the automated control actions include generating and transmitting a notification (e.g., a push notification, a text message, an email, etc.) to a user's computing device. For example, the calculated CBPS may be automatically displayed in a user interface on the user's device, along with an indication of the components or parameters that are negatively impacting the CBPS.

In some embodiments the generation and display of a user interface that displays CBPS information may be initiated, in response to the calculation of the CBPS. For example, the CBPS may be displayed via multiple graphical components (e.g., charts, graphs, etc. Additionally, the user interfaces may display information for improving the CBPS, such as by indicating devices or components that are associated with penalty scores. For example, the user interfaces may present recommendations, as discussed above, that are generated based on the CBPS. In this regard, the user interfaces may allow a user to quickly determine an overall system health and efficiency, as well as to quickly identify areas of improvement.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products including machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system comprising:
one or more memory devices having instructions stored thereon that, when executed by one or more processors, cause the one or more processors to perform operations comprising:
obtaining a first data indicating security characteristics of software or firmware of one or more system devices of a building management system (BMS), wherein the one or more system devices operate to affect an environmental condition of one or more buildings controlled by the BMS;
obtaining a second data indicating security characteristics of a server of the BMS, wherein the server operates to monitor or control the one or more system devices to affect the environmental condition of the one or more buildings;
obtaining a third data indicating network security characteristics of the BMS;
calculating a first cybersecurity score based on the first data, a second cybersecurity score based on the second data, and a third cybersecurity score based on a third data; and
calculating a cybersecurity best practices score for the BMS based on the first data, the second data, and the third data by aggregating the first cybersecurity score, the second cybersecurity score, and the third cybersecurity score to generate the cybersecurity best practices score.

2. The system of claim 1, wherein:
calculating the first cybersecurity score comprises determining a first set of cybersecurity parameters for the one or more system devices of the BMS, wherein a penalty score is subtracted from the first cybersecurity score when the one or more system devices does not meet one of the first set of cybersecurity parameters;
calculating the second cybersecurity score comprises determining a second set of cybersecurity parameters for the server, wherein a penalty score is subtracted from the second cybersecurity score when the server does not meet one of the second set of cybersecurity parameters; and
calculating the third cybersecurity score comprises determining a third set of cybersecurity parameters for one or more connectivity devices of the BMS, wherein a penalty score is subtracted from the third cybersecurity score when the one or more connectivity devices does not meet one of the third set of cybersecurity parameters.

3. The system of claim 1, wherein the third data comprises at least one of a modem firewall status, a modem port blocking status, a modem pen testing status, a modem data upload and download status, or an unauthorized user login alert.

4. The system of claim 1, the operations further comprising initiating an action based on the cybersecurity best practices score.

5. The system of claim 1, wherein the first data comprises at least one of a software version or a firmware version of at least one of the server, a supervisory controller, or a field controller.

6. The system of claim 1, wherein the second data comprises at least one of a server software version, a server software version auto update enabled status, a server firewall status, a server antivirus status, a server port status, or a server cybersecurity policy.

7. A method comprising:
obtaining a first data indicating security characteristics of software or firmware of one or more system devices of a building management system (BMS), wherein the one or more system devices operate to affect an environmental condition of one or more buildings controlled by the BMS;
obtaining a second data indicating security characteristics of a server of the BMS, wherein the server operates to monitor or control the one or more system devices to affect the environmental condition of the one or more buildings;
obtaining a third data indicating network security characteristics of the BMS;
calculating a first cybersecurity score based on the first data, a second cybersecurity score based on the second data, and a third cybersecurity score based on the third data; and
calculating a cybersecurity best practices score for the BMS based on the first data, the second data, and the third data by aggregating the first cybersecurity score, the second cybersecurity score, and the third cybersecurity score to generate the cybersecurity best practices score.

8. The method of claim 7, wherein:

calculating the first cybersecurity score comprises determining a first set of cybersecurity parameters for the one or more system devices of the BMS, wherein a penalty score is subtracted from the first cybersecurity score when the one or more system devices does not meet one of the first set of cybersecurity parameters;

calculating the second cybersecurity score comprises determining a second set of cybersecurity parameters for the server, wherein a penalty score is subtracted from the second cybersecurity score when the server does not meet one of the second set of cybersecurity parameters; and calculating the third cybersecurity score comprises determining a third set of cybersecurity parameters for one or more connectivity devices of the BMS, wherein a penalty score is subtracted from the third cybersecurity score when the one or more connectivity devices does not meet one of the third set of cybersecurity parameters.

9. The method of claim 7, the method further comprising initiating an action based on the cybersecurity best practices score.

10. The method of claim 7, wherein the first data comprises at least one of a software version or a firmware version of at least one of the server, a supervisory controller, or a field controller.

11. The method of claim 7, wherein the second data comprises at least one of a server software version, a server software version auto update enabled status, a server firewall status, a server antivirus status, a server port status, or a server cybersecurity policy.

12. The method of claim 7, wherein the third data comprises at least one of a modem firewall status, a modem port blocking status, a modem pen testing status, a modem data upload and download status, or an unauthorized user login alert.

13. A non-transitory computer-readable media comprising computer-readable instructions stored thereon that when executed by a processor cause the processor to perform operations comprising:

obtaining a first data indicating security characteristics of software or firmware of one or more system devices of a building management system (BMS), wherein the one or more system devices operate to affect an environmental condition of one or more buildings controlled by the BMS;

obtaining a second data indicating security characteristics of a server of the BMS, wherein the server operates to monitor or control the one or more system devices to affect the environmental condition of the one or more buildings;

obtaining a third data indicating network security characteristics of the BMS;

calculating a first cybersecurity score based on the first data, a second cybersecurity score based on the second data, and a third cybersecurity score based on the third data; and calculating a cybersecurity best practices score for the BMS based on the first data, the second data, and the third data by aggregating the first cybersecurity score, the second cybersecurity score, and the third cybersecurity score to generate the cybersecurity best practices score.

14. The non-transitory computer-readable media of claim 13, wherein:

calculating the first cybersecurity score comprises determining a first set of cybersecurity parameters for the one or more system devices of the BMS, wherein a penalty score is subtracted from the first cybersecurity score when the one or more system devices does not meet one of the first set of cybersecurity parameters;

calculating the second cybersecurity score comprises determining a second set of cybersecurity parameters for the server, wherein a penalty score is subtracted from the second cybersecurity score when the server does not meet one of the second set of cybersecurity parameters; and calculating the third cybersecurity score comprises determining a third set of cybersecurity parameters for one or more connectivity devices of the BMS, wherein a penalty score is subtracted from the third cybersecurity score when the one or more connectivity devices does not meet one of the third set of cybersecurity parameters.

15. The non-transitory computer-readable media of claim 13, wherein the first data comprises at least one of a software version or a firmware version of at least one of the server, a supervisory controller, or a field controller.

16. The non-transitory computer-readable media of claim 13, wherein the second data comprises at least one of a server software version, a server software version auto update enabled status, a server firewall status, a server antivirus status, a server port status, or a server cybersecurity policy and wherein the third data comprises at least one of a modem firewall status, a modem port blocking status, a modem pen testing status, a modem data upload and download status, or an unauthorized user login alert.

* * * * *